_(12)_ United States Patent
Vogelsang et al.

(10) Patent No.: US 9,521,349 B2
(45) Date of Patent: Dec. 13, 2016

(54) IMAGE SENSOR ARCHITECTURE WITH POWER SAVING READOUT

(71) Applicant: Rambus Inc., Sunnyvale, CA (US)

(72) Inventors: Thomas Vogelsang, Mountain View, CA (US); Jay Endsley, San Jose, CA (US); Michael Guidash, Rochester, NY (US)

(73) Assignee: Rambus Inc., Sunnyvale, CA (US)

( * ) Notice: Subject to any disclaimer, the term of this patent is extended or adjusted under 35 U.S.C. 154(b) by 6 days.

(21) Appl. No.: 14/727,869

(22) Filed: Jun. 2, 2015

(65) Prior Publication Data

US 2015/0373290 A1 Dec. 24, 2015

Related U.S. Application Data

(60) Provisional application No. 62/014,565, filed on Jun. 19, 2014.

(51) Int. Cl.

| H04N 5/228 | (2006.01) |
|---|---|
| H04N 5/217 | (2011.01) |
| H04N 5/222 | (2006.01) |
| H04N 5/378 | (2011.01) |
| H04N 5/369 | (2011.01) |
| H04N 5/345 | (2011.01) |
| H04N 5/376 | (2011.01) |

(52) U.S. Cl.
CPC ............ *H04N 5/378* (2013.01); *H04N 5/3454* (2013.01); *H04N 5/3698* (2013.01); *H04N 5/376* (2013.01)

(58) Field of Classification Search
CPC ...... G06F 1/3206; G06F 1/3234; G06F 1/324; G06F 1/3296; G06F 1/3203; G06F 1/3293; G01N 33/0031; A61B 2560/0209; Y02B 60/121
USPC ................ 348/222.1, 229.1, 241, 308, 333.1
See application file for complete search history.

(56) References Cited

U.S. PATENT DOCUMENTS

| 6,498,576 | B1 | 12/2002 | Tian et al. | |
|---|---|---|---|---|
| 7,570,293 | B2 * | 8/2009 | Nakamura | ............. H04N 5/335 341/126 |
| 7,738,013 | B2 | 6/2010 | Galambos et al. | |
| 8,102,442 | B2 * | 1/2012 | Lehr | .................... H04N 5/3575 341/126 |
| 8,537,241 | B2 | 9/2013 | Ayers et al. | |
| 9,204,072 | B2 * | 12/2015 | Hiyama | ................. H04N 5/378 |
| 2003/0043089 | A1 * | 3/2003 | Hanson | .................. H04N 3/155 345/55 |
| 2004/0043089 | A1 * | 3/2004 | Rabie | .................. A61K 36/487 424/779 |
| 2013/0027594 | A1 | 1/2013 | Krymski | |

\* cited by examiner

*Primary Examiner* — Trung Diep
(74) *Attorney, Agent, or Firm* — Fenwick & West LLP

(57) ABSTRACT

Pixels within an image sensor pixel array are sampled by corresponding conditional read circuitry. A zero pixel value is outputted for each pixel associated with a sample less than a conversion threshold, and a saturated pixel value is outputted for each pixel associated with a sample greater than or equal to a saturation threshold. Samples greater than or equal to the conversion threshold and less than the saturation threshold are converted by an ADC, and a converted pixel value is output for each associated above threshold pixel. The ADC (along with any corresponding amplifiers) are powered on for a variable period depending on the number of pixels needing conversion during the conversion of such samples during a read period, and are powered off for the remainder of the read period.

20 Claims, 16 Drawing Sheets

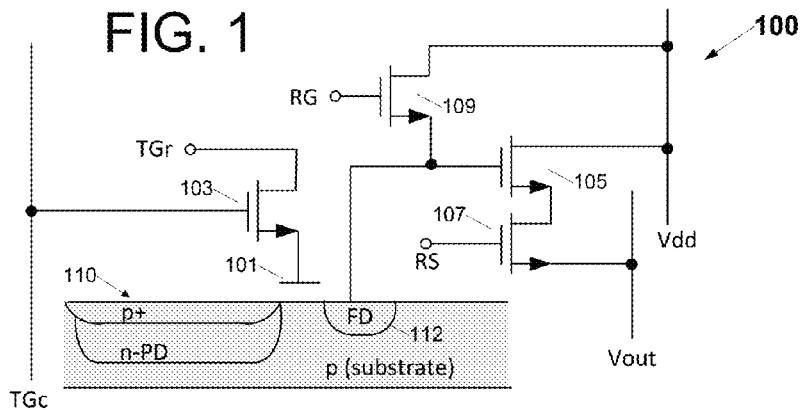
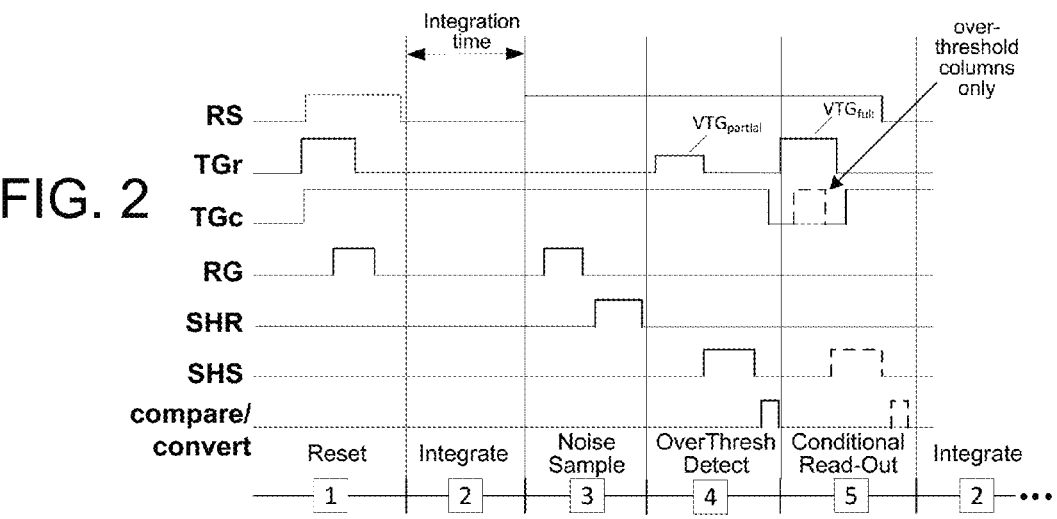
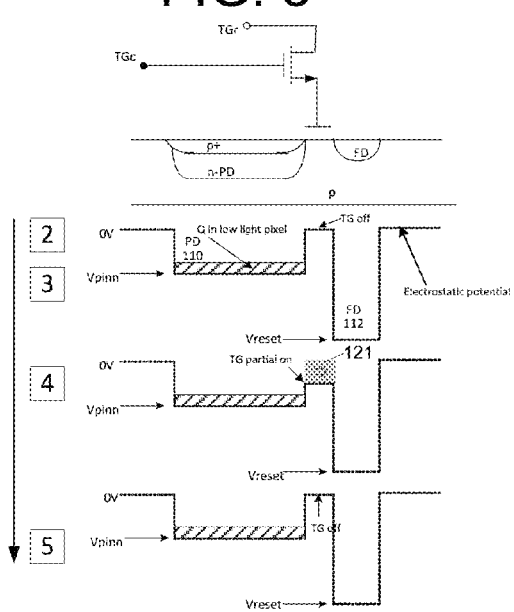
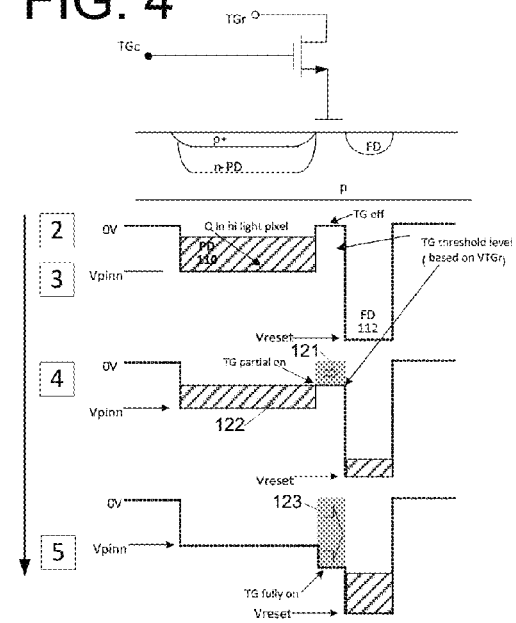

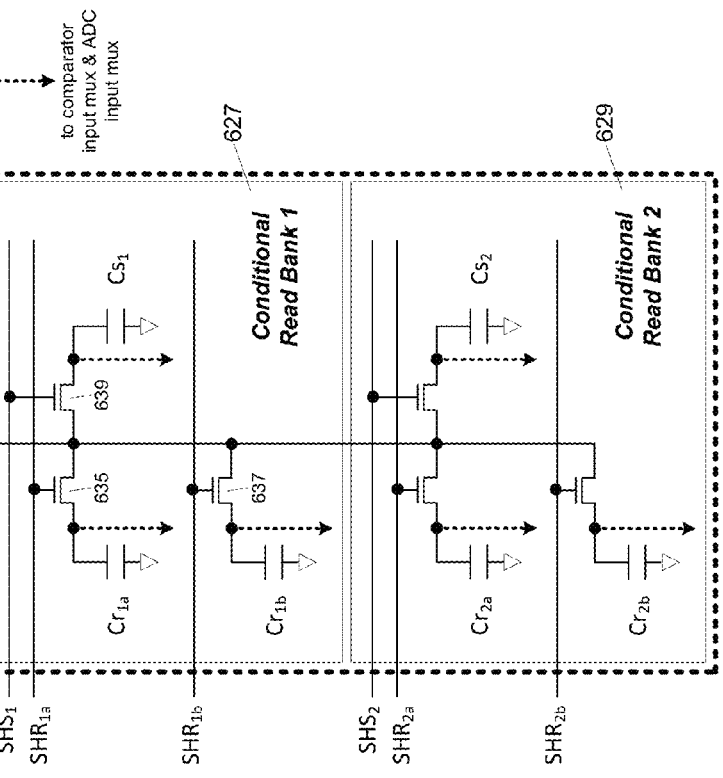
FIG. 13
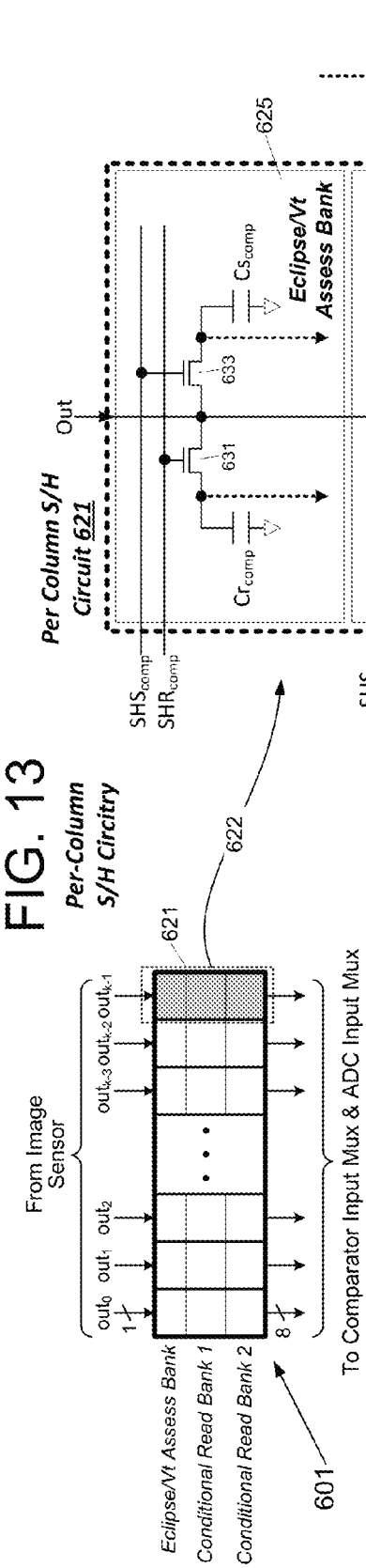
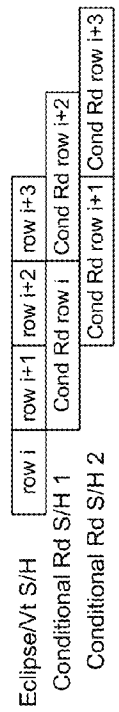
FIG. 14
Sample & Hold Pipeline

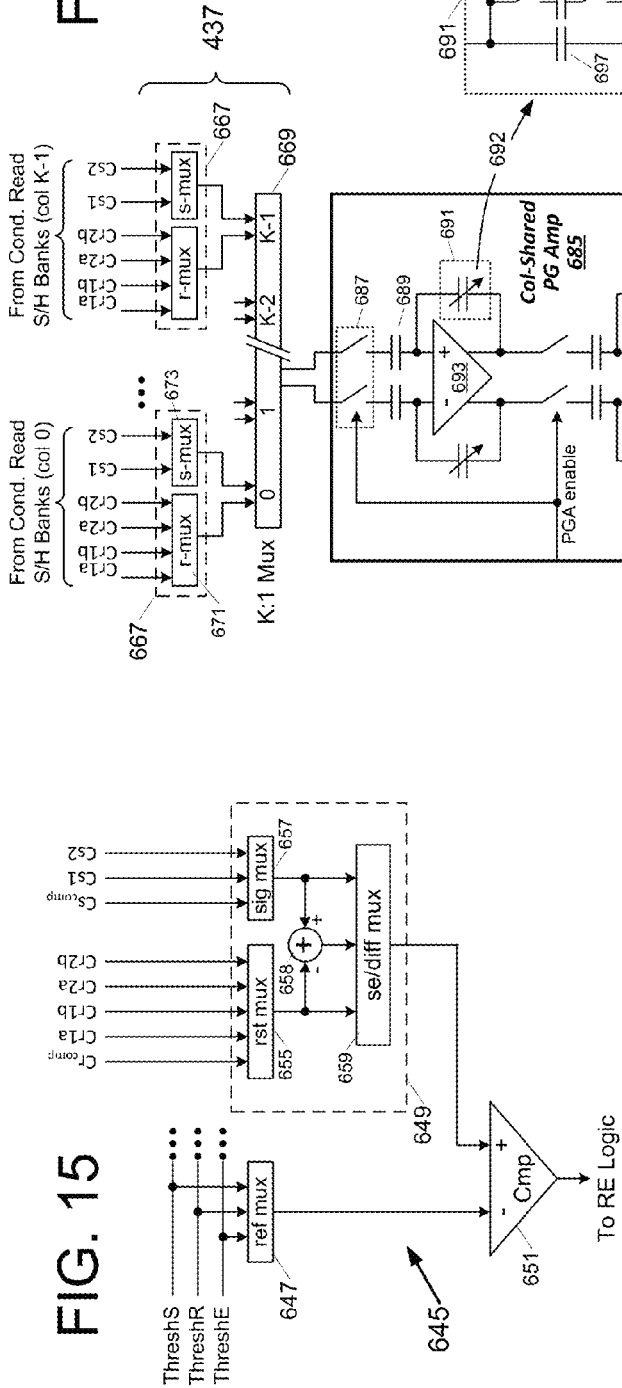
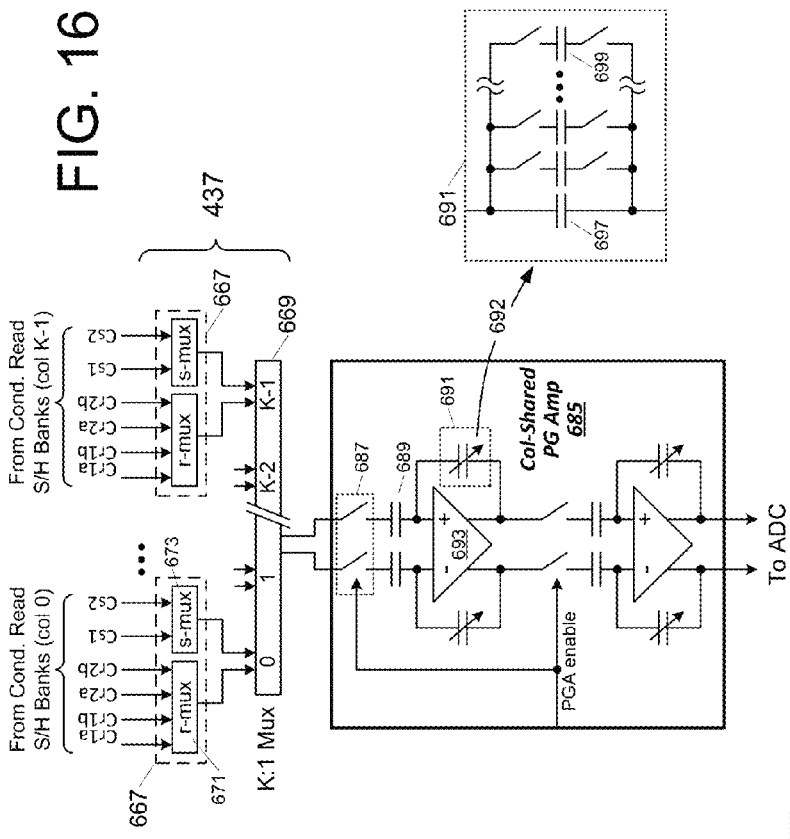
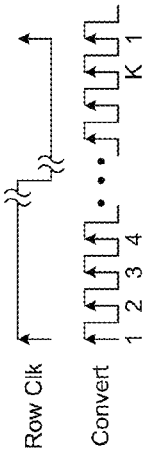

IMAGE SENSOR ARCHITECTURE WITH POWER SAVING READOUT

RELATED APPLICATIONS

This application claims priority to U.S. Provisional Application No. 62/014,565, filed Jun. 19, 2014, entitled "Image Sensor Architecture with Power Saving Readout", the contents of which are incorporated by reference herein in their entirety.

TECHNICAL FIELD

The present disclosure relates to the field of electronic image sensors, and more specifically to a sampling architecture for use in such image sensors.

BRIEF DESCRIPTION OF THE DRAWINGS

The various embodiments disclosed herein are illustrated by way of example, and not by way of limitation, in the figures of the accompanying drawings and in which like reference numerals refer to similar elements and in which:

FIG. 1 illustrates an embodiment of a modified 4-transistor pixel in which a non-destructive overthreshold detection operation is executed to enable conditional-read operation in conjunction with correlated double sampling;

FIG. 2 is a timing diagram illustrating an exemplary pixel cycle within the progressive read-out pixel of FIG. 1;

FIGS. 3 and 4 illustrate exemplary electrostatic potential diagrams for the photodiode, transfer gate and floating diffusion of FIG. 1 below their corresponding schematic cross-section diagrams;

FIG. 13 illustrates an embodiment of multi-bank sample-and-hold circuit that may be used to implement the sample-and-hold (S/H) circuitry depicted in FIG. 11;

FIG. 14 illustrates an exemplary sample and hold pipeline corresponding generally to the S/H bank usage intervals within the timing arrangement of FIG. 12;

FIG. 15 illustrates embodiments of a reference multiplexer, comparator input multiplexer and comparator that may be used to implement like-named components depicted in FIG. 10;

FIG. 16 illustrates embodiments of a column-shared programmable gain amplifier and K:1 ADC input multiplexer that may be deployed within the embodiment of FIG. 10.

FIG. 17A illustrates embodiments of a read-enable multiplexer, ADC-enable logic and ADC circuit that may be used to implement the K:1 read-enable multiplexer and ADC circuitry of FIG. 10;

FIG. 17B illustrates a convert signal timing diagram corresponding to FIG. 17A;

DETAILED DESCRIPTION

Figure 5:
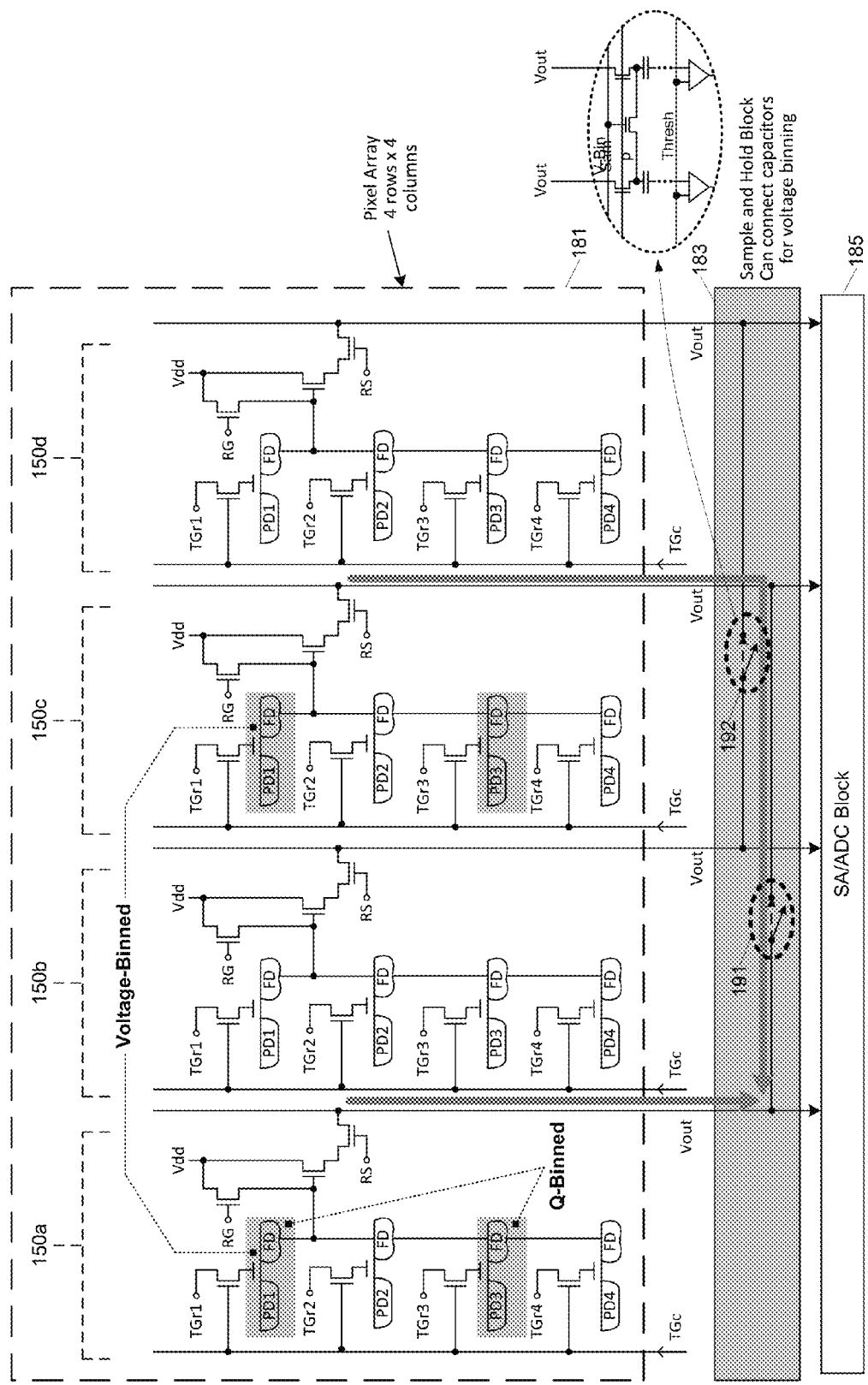
FIG. 5 illustrates a column-interconnect architecture that may be applied to enable voltage-binning of analog signals read-out from selected columns of 4×1 quad-pixel blocks.

In various embodiments described herein, image sensor pixels are read out during respective subframes of an exposure interval. In some embodiments, charge associated with a sampled pixel is converted by an analog-to-digital converter (ADC) only when the charge is less than a saturated threshold and greater than a conversion threshold (also referred to herein as a "conditional-read threshold"). Such pixels are referred to herein as "above threshold pixels." By this arrangement, an ADC is only operated during the readout of above threshold pixels, and is powered down during readout of the other pixels in the set of sampled pixels. In some embodiments, a pre-determined zero pixel value is read out for pixels associated with a charge less than the conversion threshold. Such pixels are referred to herein as "below threshold pixels." In some embodiment, a pre-determined saturated pixel value is read out for pixels associated with a charge greater than the saturated threshold. Such pixels are referred to herein as "saturated pixels." In some embodiments, a programmable-gain amplifier (PGA) is also only operated during the readout of above threshold pixels, and is powered down during the readout of below threshold pixels and saturated pixels. Power use within such an image sensor architecture is beneficially reduced by operating certain circuit components (such as PGAs and ADCs) only when needed. These and other features and benefits are disclosed in greater detail below.

High-SNR Image Sensor with Non-Destructive Threshold Monitoring

While three-transistor (3T) pixel architectures are suitable for many applications, four-transistor (4T) designs having a "transfer gate" disposed between the photodiode and a floating-diffusion region provide a number of advantages. First, the floating diffusion, which serves as a temporary storage of charge transferred from the photodiode, may be reset (e.g., coupled to $V_{DD}$) and read out without disturbing the charge state of the photodiode, thereby enabling a correlated double-sampling (CDS) operation in which the state of the floating diffusion is read twice; immediately after reset (the "reset-state" sample or noise sample) and then again after charge transfer from the photodiode (the "signal-state" sample), thus enabling the noise or reset value to be subtracted from the photodiode output signal (i.e., subtracting the reset-state sample from the signal-state sample), significantly improving the SNR. Another advantage is, counterintuitively, a more compact pixel design as the switched connection between the photodiode and a source follower transistor (i.e., via the transfer gate and floating diffusion) enables the source follower transistor as well as a reset transistor and access transistor to be shared among multiple photodiodes. For example, only seven transistors are required to implement a set of four "4T" pixels having a shared source follower, reset transistor and access transistor (i.e., four transfer-gates plus the three shared transistors), thus producing an average of 1.75 transistors per pixel (1.75T).

In terms of pixel read-out, the direct connection between photodiode and source follower in a 3T pixel permits the charge state of the photodiode to be read-out without disturbing ongoing photocharge integration. This "non-destructive read" capability is particularly advantageous in the context of the conditional reset operation described above as the 3T pixel may be sampled following an integration interval and then conditionally permitted to continue integrating charge (i.e., not be reset) if the sampling operation indicates that the charge level remains below a predetermined threshold. By contrast, the charge transfer between photodiode and floating diffusion as part of a 4T pixel readout disrupts the state of the photodiode, presenting a challenge for conditional-read operation.

In a number of embodiments described below in connection with FIGS. 1-4, a modified 4T pixel architecture is operated in a manner that dissociates the reset threshold from pixel sample generation to enable a non-destructive (and yet correlated double-sampling) overthreshold determination. That is, instead of reading out the net level of charge accumulated within the photodiode (i.e., a pixel sampling operation) and conditionally resetting the photodiode based on that read-out (i.e., as in a 3T pixel sampling operation), a preliminary overthreshold sampling operation is executed to enable detection of an overthreshold state within the photodiode, with the full photodiode read-out (i.e., pixel sample generation) being conditionally executed according to the preliminary overthreshold detection result. In effect, instead of conditionally resetting the photodiode according to the pixel value obtained from full photodiode readout, full photodiode readout is conditioned on the result of a preliminary, non-destructive determination of whether the threshold has been exceeded; an approach enabled, in at least one embodiment, by dissociating the conditional-read threshold from the pixel value generation.

FIG. 1 illustrates an embodiment of a modified 4T pixel 100, referred to herein as a "progressive read-out" or "conditional-read" pixel, in which a non-destructive overthreshold detection operation is executed to enable conditional-reset/read operation in conjunction with correlated double sampling. As explained more fully below, the overthreshold detection involves a limited read-out of the photodiode state which, when determined to indicate an overthreshold condition, will trigger a more complete read-out of the photodiode state. That is, pixel 100 is read-out in a progression from a limited overthreshold detection read-out to a complete read-out, the latter being conditional according to the overthreshold detection result and hence referred to as a conditional read.

Still referring to FIG. 1, conditional-read pixel 100 includes a transfer gate 101 disposed between a photodiode 110 (or any other practicable photosensitive element) and floating diffusion node 112, and a transfer-enable transistor 103 coupled between a transfer-gate row line (TGr) and transfer gate 101. The gate of transfer-enable transistor 103 is coupled to a transfer-gate column line (TGc) so that, when TGc is activated, the potential on TGr is applied (minus any transistor threshold) via transfer-enable transistor 103 to the gate of transfer-gate 101, thus enabling charge accumulated within photodiode 110 to be transferred to floating diffusion 112 and sensed by the pixel readout circuitry. More specifically, floating diffusion 112 is coupled to the gate of source follower 105 (an amplification and/or charge-to-voltage conversion element), which is itself coupled between a supply rail ($V_{DD}$ in this example) and a read-out line, Vout, to enable a signal representative of the floating diffusion potential to be output to read-out logic outside the pixel.

As shown, a row-select transistor 107 is coupled between source follower 105 and the read-out line to enable multiplexed access to the read-out line by respective rows of pixels. That is, row-select lines ("RS") are coupled to the control inputs of row-select transistors 107 within respective rows of pixels and operated on a one-hot basis to select one row of pixels for sense/read-out operations at a time. A reset transistor 109 is also provided within the progressive read-out pixel to enable the floating diffusion to be switchably coupled to the supply rail (i.e., when a reset-gate line (RG) is activated) and thus reset. The photodiode itself may be reset along with the floating diffusion by fully switching on transfer gate 101 (e.g., by asserting TGc while TGr is high) and reset transistor 109 concurrently, or by merely connecting the photodiode to a reset-state floating diffusion.

FIG. 2 is a timing diagram illustrating an exemplary pixel cycle within the progressive read-out pixel of FIG. 1. As shown, the pixel cycle is split into five intervals or phases corresponding to distinct operations carried out to yield an eventual progressive read-out in the final two phases. In the first phase (phase 1), a reset operation is executed within the photodiode and floating diffusion by concurrently asserting logic high signals on the TGr, TGc and RG lines to switch on transfer-enable transistor 103, transfer gate 101 and reset transistor 109, thereby switchably coupling photodiode 110 to the supply rail via transfer gate 101, floating diffusion 112 and reset transistor 109 (the illustrated sequence can begin with an unconditional reset (e.g., at the start of a frame), and can also begin from a preceding conditional read-out/reset operation). To conclude the reset operation, the TGr and RG signals (i.e., signals applied on like-named signal lines) are lowered, thereby switching off transfer gate 101 (and reset transistor 109) so that the photodiode is enabled to accumulate (or integrate) charge in response to incident light in the ensuing integration phase (phase 2). Lastly, although the row-select signal goes high during the reset operation shown in FIG. 2, this is merely a consequence of an implementation-specific row decoder that raises the row-select signal whenever a given row address is decoded in connection with a row-specific operation (e.g., raising the TGr and RG signals during reset directed to a given row). In an alternative embodiment, the row decoder may include logic to suppress assertion of the row-select signal during reset as indicated by the dashed RS pulse in FIG. 2.

At the conclusion of the integration phase, the floating diffusion is reset (i.e., by pulsing the RG signal to couple the floating diffusion to the supply rail) and then sampled by a sample-and-hold element within the column read-out circuit. The reset and sample operation (shown as phase 3 in FIG. 2), in effect, samples the noise level of the floating diffusion and is executed in the embodiment shown by asserting the row-select signal for the pixel row of interest (i.e., the "$i^{th}$" pixel row, selected by RSi) while pulsing a reset-state sample-and-hold signal (SHR) to convey the state of the floating diffusion to the sample-and-hold element (e.g., a switch-accessed capacitive element) within the column read-out circuit via read-out line, Vout.

After acquiring the noise sample, or floating diffusion (FD) reset level, in phase 3, an overthreshold detection operation is executed in phase 4 by raising the TGr line to a partially-on, "overthreshold-detection" potential, $VTG_{partial}$, concurrently with switching on transfer-enable transistor 103 (i.e., by asserting a logic high TGc signal, although in this embodiment TGc is already on). By this operation, illustrated graphically in FIGS. 3 and 4, $VTG_{partial}$ is applied to transfer gate 101 to switch the transfer gate to a "partial on" state ("TG partial on"). Referring to FIGS. 3 and 4, electrostatic potential diagrams for photodiode 110 (a pinned photodiode in this example), transfer gate 101 and floating diffusion 112 are shown below their corresponding schematic cross-section diagrams. Note that the depicted levels of electrostatic potential are not intended to be an accurate representation of the levels produced in an actual or simulated device, but rather a general (or conceptual) representation to illustrate the operation of the pixel read-out phases. Upon application of $VTG_{partial}$ to transfer gate 101, a relatively shallow channel potential 121 is formed between photodiode 110 and floating diffusion 112. In the example of FIG. 3, the level of charge accumulated within the photodiode at the time of the overthreshold detection operation (phase 4) does not rise to the threshold level required for charge to spill over (i.e., be transferred) to the floating diffusion via the shallow channel potential of the partially-on transfer gate. Accordingly, because the accumulated charge level does not exceed the spillover threshold established by application of $VTG_{partial}$ to the control node of transfer gate 101, there is no spillover from the photodiode to the floating diffusion and the accumulated charge instead remains undisturbed within the photodiode. By contrast, in the example of FIG. 4, the higher level of accumulated charge does exceed the spillover threshold so that a portion of the accumulated charge (i.e., that subset of charge carriers that are above the transfer gate partially-on electrostatic potential) spills over into floating diffusion node 112, with the residual accumulated charge remaining within the photodiode as shown at 122.

Still referring to FIGS. 2, 3 and 4, prior to conclusion of overthreshold detection phase 4, the charge level of the floating diffusion is sampled and held within a signal-state sample-and-hold element (i.e., in response to assertion of signal SHS) to yield a threshold-test sample—the difference between the signal-state sample and the previously obtained reset-state sample—to be evaluated with respect to a conditional-read threshold. In one embodiment, the conditional-read threshold is an analog threshold (e.g., to be compared with the threshold-test sample in a sense amplifier in response to assertion of a compare/convert strobe signal) set or programmed to a setting above the sampling noise floor, but low enough to enable detection of minute charge spillover via the shallow transfer gate channel. Alternatively, the threshold-test sample may be digitized in response to assertion of the compare/convert signal (e.g., within an analog-to-digital converter that is also used to generate the finalized pixel sample value) and then compared with a digital conditional-read threshold, again, set (or programmed to a setting) above the noise floor, but low enough to enable detection of trace charge spillover. In either case, if the threshold-test sample indicates that no detectable spillover occurred (i.e., threshold-test sample value is less than conditional-read spillover threshold), then the photodiode is deemed to be in the underthreshold state shown in FIG. 3 and the TGc line is held low in the ensuing conditional read-out phase (phase 5, the final phase) to disable transfer gate 101 for the remainder of the progressive read-out operation—in effect, disabling further read-out from the photodiode and thus enabling the photodiode to continue integrating charge without disruption for at least another sampling interval. By contrast, if the threshold-test sample indicates a spillover event (i.e., threshold-test sample greater than conditional-read/spillover threshold), then the TGc line is pulsed during the conditional read-out phase in combination with application of a fully-on, "remainder-transfer" potential, $VTG_{full}$, to the TGr line, thereby enabling the remainder of the charge (i.e., charge 122 as shown in FIG. 4) within photodiode 110 to be transferred to floating diffusion 112 via the full-depth transfer-gate channel (123) so that, between the overthreshold transfer in phase 4 and the remainder transfer in phase 5, the charge accumulated within the photodiode since the hard reset in phase 1 is fully transferred to the floating diffusion where it may be sensed in a pixel read-out operation. In the embodiment shown, the pixel-readout operation is effected by pulsing the SHS signal and compare/convert strobe in sequence during conditional read-out phase 5, though either or both of those pulses may optionally be suppressed in absence of an overthreshold detection. Note that conditional read-out of the photodiode (i.e., effected by pulsing TGc in conjunction with application of $VTG_{full}$ on TGr) effectively resets the photodiode (i.e., drawing off all charge to the floating diffusion), while suppression of the conditional read-out leaves the integration state of the photodiode undisturbed. Accordingly, execution of the conditional read-out operation in phase 5 conditionally resets the photodiode in preparation for integration anew in the succeeding sampling interval (subframe) or refrains from resetting the photodiode to enable cumulative integration in the subsequent sampling interval. Thus, in either case, a new integration phase follows phase 5, with phases 2-5 being repeated for each subframe of the overall frame (or exposure) interval, before repeating the hard reset in a new frame. In other embodiments, where cumulative integration is permitted across frame boundaries, the hard reset operation may be executed to initialize the image sensor and omitted for an indeterminate period of time thereafter.

In the embodiment shown, each column of the pixel array is populated by shared-element pixels in which every four pixels form a quad block cell and contain respective photodiodes 110 (PD1-PD4), transfer gates 101, and transfer-enable transistors 103, but share a floating diffusion node 152, reset transistor 109, source follower 105 and row-select transistor 107. By this arrangement, the average transistor count per pixel is 2.75 (i.e., 11 transistors/4 pixels), thus effecting a relatively efficient, 2.75T-pixel image sensor.

Image Decimation and Pixel Binning

A number of conditional-read image sensor embodiments described herein are operable in decimation modes that yield less than maximum image resolution. For example, in one embodiment an image sensor capable of generating an 8 MP (8 megapixel) output in a still-image mode, yields a 2 MP output in a decimated, high-definition (HD) video mode; a 4:1 decimation ratio (higher or lower resolutions may apply in each mode, and other decimation modes and ratios may be achieved in alternative embodiments; also, if the still and video frame aspect ratios differ, some areas of the sensor may not be used at all in one or the other modes).

While post-digitization logic may be provided to decimate full-resolution data (e.g., on-chip logic at the output of the ADC bank or off-chip processing logic), pixel charge aggregation or "binning" within the pixel array and/or voltage binning within sample-and-hold storage elements is applied in a number of embodiments to effect pre-digitization (i.e., pre-ADC and thus analog) decimation, obviating die-consuming and power-consuming digital binning logic and, in many cases, yielding improved signal-to-noise ratio in the decimated output.

FIG. 5 illustrates a column-interconnect architecture that may be applied to enable voltage-binning of analog signals read-out from selected columns of 4×1 quad-pixel blocks 150a-150d. By fixing a column offset between a pixel pair within each column and a like-filtered/same color-plane pair of pixels coupled to the same row lines (i.e., fixed at a spacing of two columns in the example shown) and by providing switching elements at the column read-out points of pixel array 181 (i.e., switching elements 191 and 192 within sample-and-hold circuitry 183), it becomes possible to "voltage-bin" the results of the two charge-binned pixel pairs within sample-and-hold circuitry 183, thus combining (i.e., aggregating, binning) the four corner pixels in each 3×3 pixel group prior to digitization within the ADC elements of SA/ADC block 185. Although only four quad pixel blocks are illustrated within the pixel array 181 in the embodiment of FIG. 5, in practice, the pixel array 181 can include any number of quad pixel blocks, or any other suitable arrangement of pixels.

Figure 6:
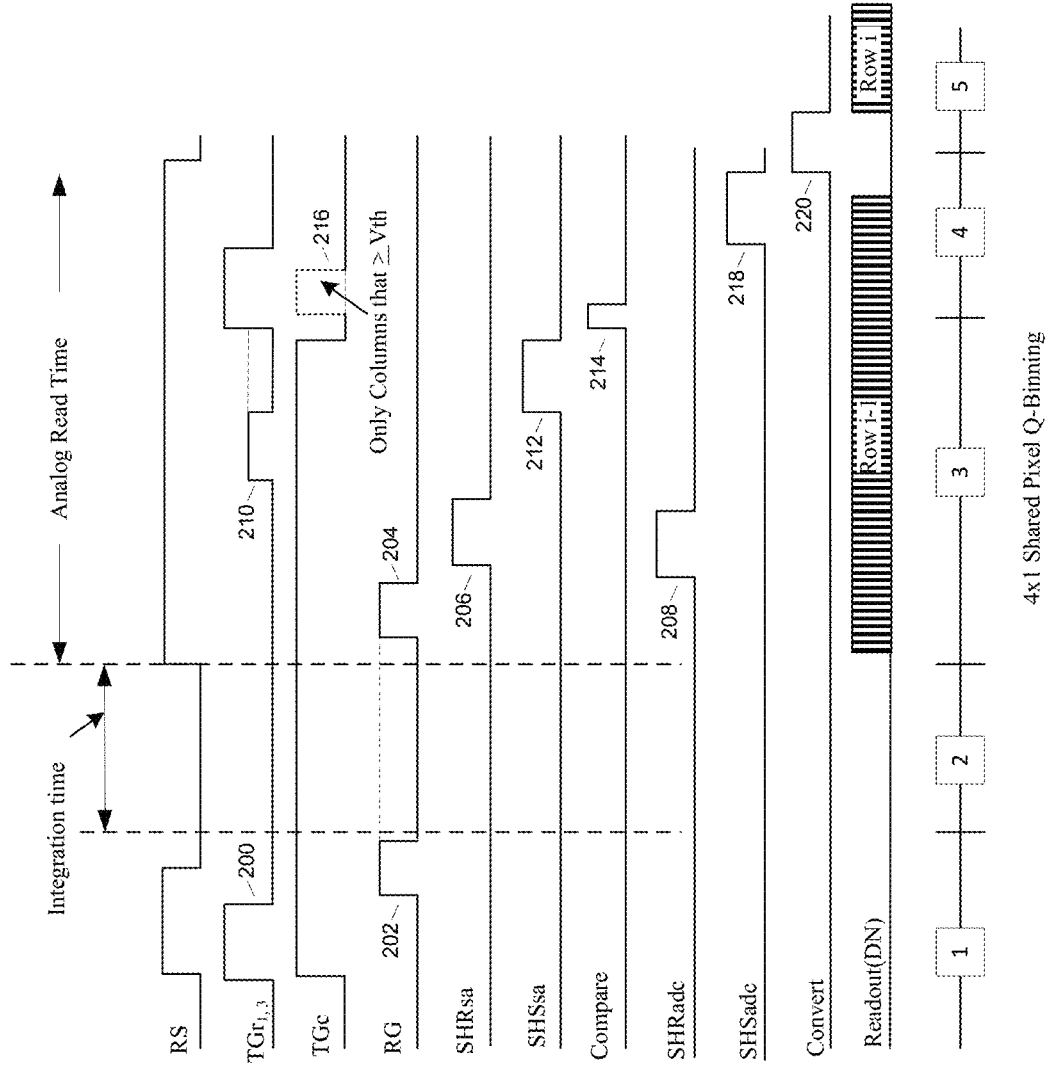
FIG. 6 illustrates an exemplary timing diagram of binned-mode read-out operations within the 4×1 quad-pixel architecture of FIG. 5.

FIG. 6 illustrates an exemplary timing diagram of binned-mode read-out operations within the 4×1 quad-pixel architecture of FIG. 5. In the example shown, row lines for pixel rows i and i+2 are operated in lock step to achieve 2:1 charge binning within the shared floating diffusion of a given quad-pixel block. More specifically, row signals for pixel rows 1 and 3 of a 4×1 quad pixel block (or row of such quad pixel blocks) are asserted in unison, followed by locked-step assertion of row signals for pixel rows 2 and 4, before advancing to assert row signals for the next row of 4×1 quad pixel blocks. Transverse connections are established within sample-and-hold switch elements (e.g., at 191 and 192 of sample-and-hold block 183 as shown in FIG. 5) to achieve 2:1 voltage binning and thus an overall 4:1 analog signal summing and concomitant image decimation.

Referring more specifically to FIG. 6, the shared row-select signals (RS), shared reset-gate signals (RG) and row transfer-gate signals ($TGr_{1,3}$) for rows 1 and 3 are operated in lock step to reset the photodiodes and shared floating diffusion of the selected pixel rows during hard-reset phase 1, permit charge integration during integration phase 2, determine whether the charge-binned and voltage-binned charge-accumulation results within each column-interleaved collection of four pixels (i.e., the 3×3 corner pixels as described in reference to FIG. 5) exceed the conditional-read threshold in threshold-test phase 3, and, if an overthreshold condition is detected, conditionally read-out and digitize the full charge-binned and voltage-binned accumulated charge within the subject pixel collections in conditional read-out phase 4 before transmitting the digitized pixel value to downstream (on-chip or off-chip) processing logic in output phase 5. Considering the phases one by one, during hard-reset phase 1, the row-transfer gate signals TGr1 and TGr3 are pulsed to $VTG_{full}$ (as shown at 200) while simultaneously raising column transfer-gate signal TGc, thus transferring accumulated charge from photodiodes PD1 and PD3 to their shared floating diffusion node. After the photodiode-to-floating-diffusion charge transfer, reset signal RG is pulsed at 202 to clear charge from the floating diffusion in preparation for the ensuing charge integration in phase 2. At the start of threshold-test phase 3, the reset signal is pulsed again (204) to reset the floating diffusions and then signals SHRsa and SHRadc are pulsed at 206 and 208 (while RSi is asserted) to capture samples of the reset-state of the floating diffusions within the respective sample-and-hold elements for the sense amplifier and ADC. After capture, switch 191 is closed to voltage-share between the reset signal sample-and-hold elements for columns 1 and 3, thus producing a reset signal representative of the average of the column 1 and 3 floating diffusions. At 210, TGr1 and TGr3 are raised to the partial-on transfer potential, $VTG_{partial}$, to enable charge spillover to the shared floating diffusions if an overthreshold condition exists in either or both of the photodiodes of the subject pixels in a column. The SHSsa signal is then pulsed at 212 to capture the signal-state of the floating diffusion node. Subsequently, switch 191 is closed to voltage-share between the threshold-compare sample-and-hold elements for columns 1 and 3, thus voltage binning the two charge-binned spillover samples. The threshold-test phase is concluded by lowering the TGc signal and asserting the compare-strobe (214) to trigger a threshold comparison within the sense amplifier of either column 1 or column 3 (the other may be deactivated), comparing the aggregated spillover charge from the four charge/voltage binned pixels against a conditional-read threshold. If the comparison result indicates an overthreshold condition, the TGc signals on both columns 1 and 3 are pulsed at 216 during application of $VTG_{full}$ on the TGr1 and TGr3 lines, (thus enabling a full read-out of photodiodes PD1 and PD3 to the shared floating diffusions within corresponding quad pixel blocks), and then the SHSadc signal is raised at 218 to capture the signal-state of the floating diffusion nodes within a signal-state sample-and-hold element in each column. Subsequently, switch 191 is closed to voltage-share between the signal-state sample-and-hold elements for columns 1 and 3, (i.e., voltage-binning the charge-binned floating diffusion contents). Thereafter, the convert-strobe is pulsed at 220 to trigger an ADC operation (for either column 1 or 3, but both are not necessary) with respect to the voltage/charge-binned signal state captured within the sample-and-hold circuit (if any), followed by transmission of the ADC output in phase 5. As discussed above, the ADC operation and data transmission operations may be suppressed to save power and reduce signaling bandwidth if an overthreshold condition is not detected in threshold-test phase 4.

Split-Gate Architecture

Figure 7:
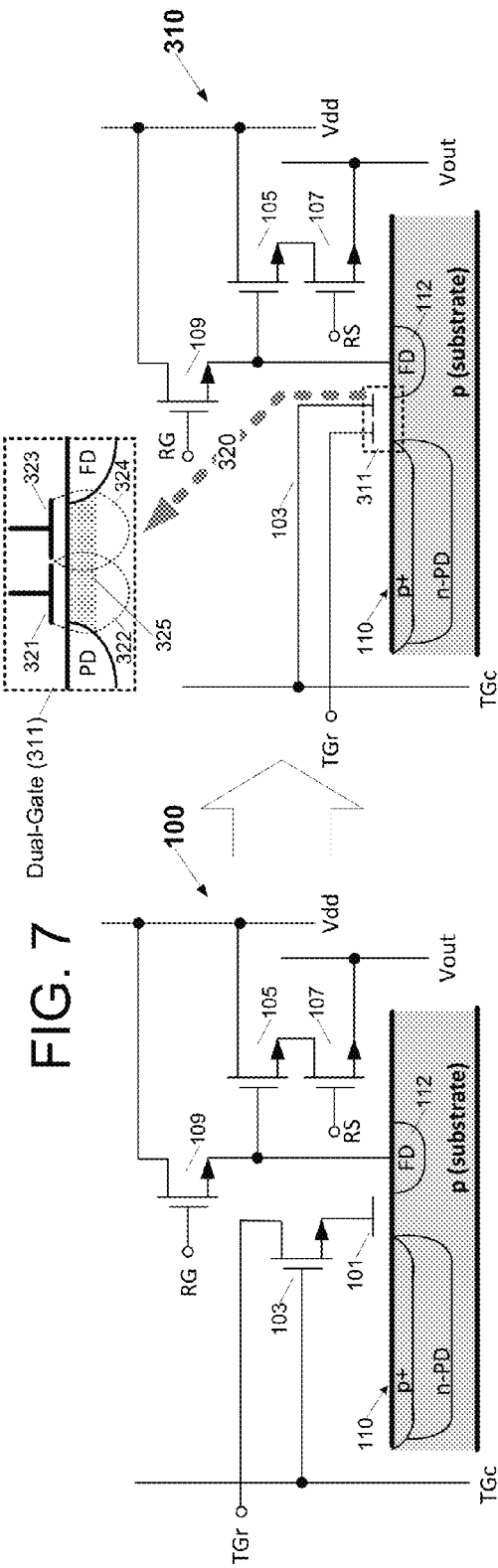
FIG. 7 contrasts embodiments of the conditional-read pixel of FIG. 1 and a "split-gate" pixel.

FIG. 7 contrasts embodiments of the conditional-read pixel 100 of FIG. 1 and a modified pixel architecture 310, referred to herein as "split-gate" conditional-read pixel or split-gate pixel. In the embodiment shown, split-gate pixel 310 includes a photodiode 110 together with the same floating diffusion 112, reset transistor 109, source-follower 105, and read-select transistor 107 as pixel 100, but omits transfer-enable transistor 103 and single-control transfer-gate 101 in favor of a split, dual-control transfer-gate 311. Referring to detail view 320, dual-control transfer gate (or "dual-gate") includes distinct (separate) row and column transfer gate elements 321 and 323 disposed adjacent one another over the substrate region between photodetector 110 (PD) and floating diffusion 112 (FD). The row and column transfer gate elements (321 and 323) are coupled to row and column control lines, respectively, to receive row and column control signals, TGr and TGc and thus are independently (separately) controlled. As discussed in further detail below, by omitting the source/drain implant ordinarily required between series-coupled transistors (and thus between adjacent gate terminals), the row and column transfer gate elements may be disposed closely enough to one another that the resulting overlapping electrostatic fields will form a continuous enhancement channel 325 when both TGr and TGc are asserted, (at a signal level to provide charge transfer), while maintaining an ability to interrupt the channel when either of TGr and TGc are deasserted, (at a signal level to prevent charge transfer). Accordingly, the logic-AND function effected by the combined operation of transfer-gate 101 and transfer-enable transistor 103 in pixel 100 may be achieved within the substantially more compact dual-control gate 311, reducing the pixel footprint (i.e., die area consumption) by a transistor or a significant portion of a transistor relative to pixel 100. In the case of a quad pixel layout, for example, the dual-gate arrangement lowers the per-pixel transistor count from 2.75T (i.e., when pixel 100 is employed) to approximately 1.75T to 2T, depending on the dual-gate implementation. In addition to the reduced non-light-gathering pixel footprint, the dual-gate design permits a negative potential to be applied to the transfer gate or transfer gates during the charge-integration (light accumulation) interval to reduce PD to FD leakage current and transfer gate dark current, a function not readily available in embodiment 100 as a negative TGr voltage may disruptively forward-bias the source/drain to substrate diodes in transfer-enable transistor 103. Further, in contrast to the floating potential that results at transfer gate 101 of pixel 100 whenever TGc is lowered, row and column transfer gate elements 321 and 323 are continuously coupled to signal driving sources and thus continuously driven to the driver output voltage (i.e., not floating), potentially reducing noise in the pixel read-out operation.

Figure 8:
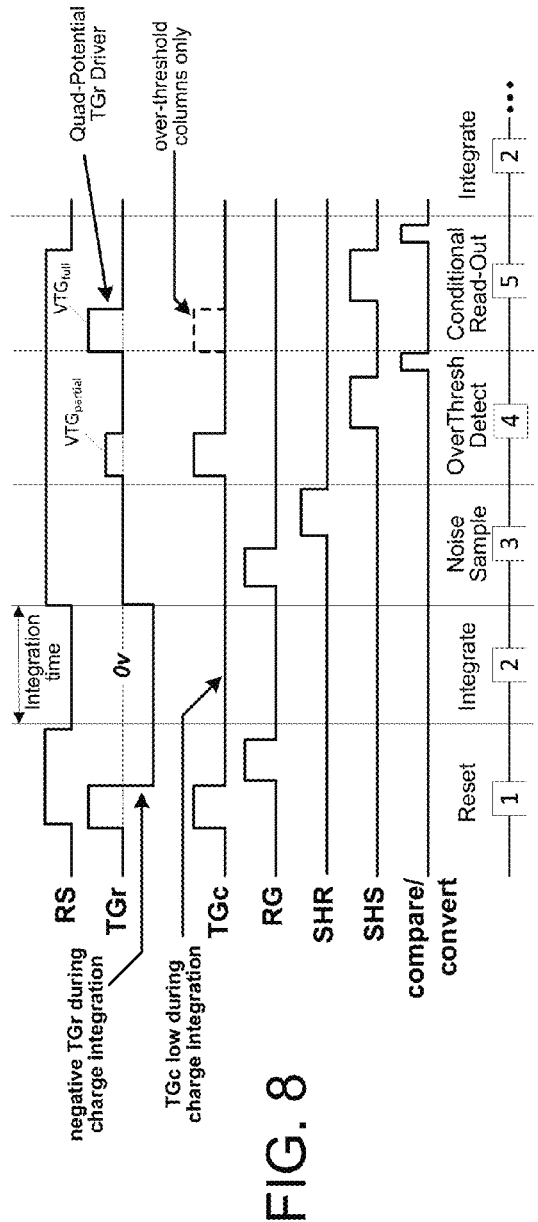
FIG. 8 is a timing diagram illustrating an exemplary pixel cycle (reset/charge integration/read-out) within the split-gate pixel of FIG. 7.

FIG. 8 is a timing diagram illustrating an exemplary pixel cycle (reset/charge integration/read-out) within the split-gate pixel of FIG. 7. As in embodiments described above, the pixel cycle is split into five intervals or phases corresponding to distinct operations carried out to yield an eventual progressive read-out in the final two phases (the pixel can also provide an unconditional readout sequence that skips phase four). Referring to both FIG. 8 and split-gate pixel 310 in FIG. 7, a reset operation is executed within the photodiode and floating diffusion in phase one by concurrently raising the TGr and TGc signals to establish a conduction channel between photodiode 110 and floating diffusion 112 (i.e., as shown at 325 in FIG. 7), and thereby reset the photodiode by enabling residual or accumulated charge within the photodiode to be transferred to the floating diffusion. After (or concurrently with) the charge transfer operation, the reset-gate signal (RG) is pulsed to switch on reset transistor 109 and thus evacuate/empty charge from the floating diffusion by switchably coupling the floating diffusion to $V_{dd}$ or other supply voltage rail. In the embodiment shown, TGr is driven to a negative potential following the photodetector reset operation (e.g., immediately after concurrent assertion with TGc or at the conclusion of the reset phase), thereby establishing a low-leakage isolation between the photodetector and floating diffusion, and reducing dark current from the region below TGr. Also, because the row and column control signals are jointly applied to adjacent transfer gate elements, TGc may be raised and lowered as necessary following the photodetector reset operation and during the ensuing integration phase (phase 2) without undesirably floating the transfer gate. Thus, TGc is lowered following pixel reset and, while shown as remaining low throughout the ensuing integration and noise sampling phases (phases 2 and 3), will toggle between high and low states during those phases to support reset and read-out operations in other pixel rows.

The noise or reset sampling operation within phase 3, overthreshold detection within phase 4 and conditional read-out (or conditional transfer) within phase 5 are carried out generally as discussed in reference to FIG. 2, except that TGc need only be raised in conjunction with the TGr pulses (i.e., to VTGpartial and VTGfull) during the partial-transfer and conditional-transfer operations. In the embodiment shown, a quad-potential TGr driver is provided within the row decoder/driver to maintain TGr at the negative potential throughout the integration phase, and then step TGr up to a pre-read potential (zero volts in the example shown) at the start of the noise sampling phase before raising TGr further to $VTG_{partial}$ and finally to $VTG_{full}$ in the overthreshold detection and conditional read-out operations, respectively. In alternative embodiments, a three-potential driver may be used to maintain TGr at the negative potential except when pulsed to $VTG_{partial}$ or $VTG_{full}$ (i.e., no pre-read potential).

Figure 9:
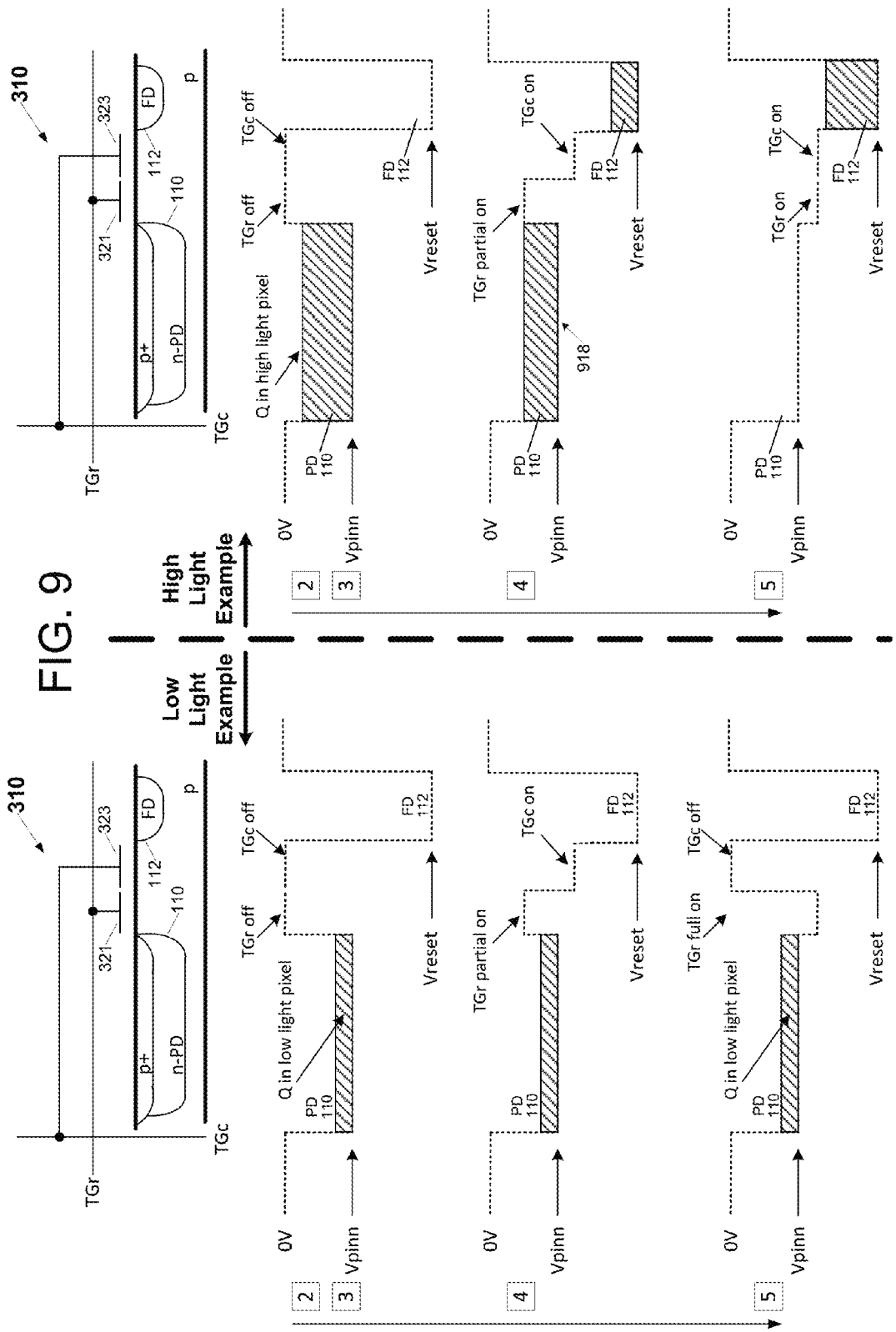
FIG. 9 illustrates exemplary low-light and high-light operation of the split-gate pixel of FIG. 7, showing electrostatic potential diagrams in each case beneath schematic cross-section diagrams of the photodetector, dual-control transfer gate and floating diffusion.

FIG. 9 illustrates exemplary low-light and high-light operation of the split-gate pixel of FIG. 7, showing electrostatic potential diagrams in each case beneath schematic cross-section diagrams of the photodetector (photodiode 110 in this example), row and column transfer gate elements 321 and 323 (i.e., forming a dual-control transfer gate) and floating diffusion 112. As in preceding examples, the depicted levels of electrostatic potential are not intended to be an accurate representation of the levels produced in an actual or simulated device, but rather a general (or conceptual) representation to illustrate the operation of the pixel read-out phases. Starting with the low-light example, a relatively low level of charge is accumulated within the photodiode during the integration phase (phase 2) so that, when TGc is asserted and TGr is raised to the partial-on potential ($VTG_{partial}$) during overthreshold detection phase 4 (i.e., after noise sample acquisition in phase 3), the charge level is insufficient to be transferred via the relatively shallow channel formed between photodiode 110 and floating diffusion 112. Because the accumulated charge level does not exceed the spillover threshold established by application of $VTG_{partial}$ to the gate element coupled to the TGr line, there is no spillover from the photodiode to the floating diffusion and the accumulated charge instead remains undisturbed within the photodiode. Because no spillover is detected during the overthreshold phase, TGc is deasserted during conditional transfer (conditional read-out) phase 5. Although some charge may migrate to the well under the row gate during TGr assertion, that charge will move back to the photodiode well when TGr is deasserted, thus maintaining the charge level within the photodiode as a starting point for further charge accumulation in a subsequent integration interval. By contrast, in the high-light example, the higher level of accumulated charge does exceed the spillover threshold during overthreshold detection phase 4 so that a portion of the accumulated charge (i.e., that subset of charge carriers that are above the transfer gate partially-on electrostatic potential) spills over into floating diffusion node 112, with the residual accumulated charge remaining within the photodiode as shown at 918. Accordingly, the spilled charge is detected during the phase 4 read phase such that, during overthreshold phase 5, TGr is raised to the $VTG_{full}$ potential concurrently with assertion of TGc, thus establishing a full conduction path through the channel formed by the dual-gate structure to transfer the entirety of the accumulated charge from photodiode 110 to floating diffusion 112.

Low Power, Pipelined Image Sensor

Figure 10:
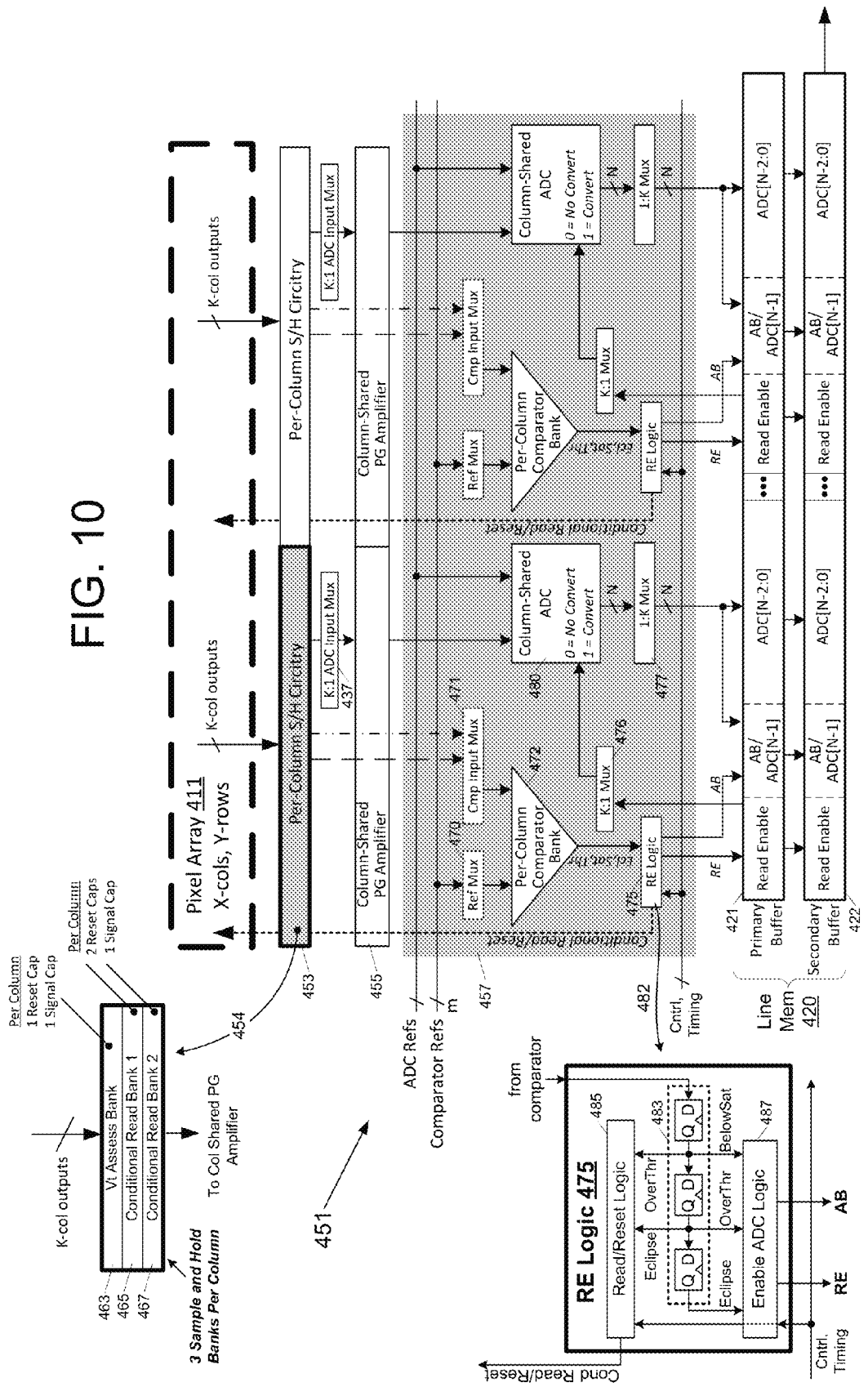
FIG. 10 illustrates an embodiment of a low power image sensor.

FIG. 10 illustrates an embodiment of a low power image sensor. In the example shown, image sensor 451 includes a pixel array 411, multi-bank sample-and-hold (S/H) circuitry 453, column-shared programmable-gain (PG) amplifier bank 455 (PGA), comparator/ADC circuitry 457 (including per-column comparator circuitry and column-shared ADC circuitry as discussed below), and line memory 420. Pixel array output lines convey pixel read-out signals to sample-and-hold circuitry 453, which in turn supplies analog samples of the read-out signals, with and without gain from the PGA 455, to comparator/ADC circuitry 457. To conserve die area, a single programmable gain amplifier 455 and single ADC circuit 480 are shared among K columns of the pixel array and cycled K times for each row of the pixel array (for an unconditional readout operation). By contrast, a dedicated (separate) threshold comparator 472 is provided for each column of pixels to enable pixel state (e.g., eclipse, under/over threshold, saturation) to be assessed across an entire row of pixels in parallel. In the embodiment shown, such "per-column" threshold comparators 472 are operated cyclically to perform multiple pixel state evaluations per pixel row (i.e., in parallel for each pixel in the row), including an eclipse assessment to determine, for each pixel in the row, whether the reset-state of the floating diffusion has fallen below an eclipse threshold; an underthreshold assessment to determine whether charge integration within the pixel has exceeded a conditional read/reset threshold, and a saturation assessment to determine whether the pixel charge integration level sampled in a conditional read/reset operation exceeds a saturation threshold (i.e., a threshold corresponding to a saturation point of ADC circuit 480). Thresholds corresponding to the various pixel state assessments (e.g., eclipse threshold, conditional read/reset threshold, saturation threshold) are applied one after another to the input of the per-column comparators 472 via corresponding reference multiplexers 470, and a comparator input multiplexer 471 is provided to select between multiple sample-and-hold circuit outputs as discussed below.

Comparator results for each pixel column are captured within a respective read-enable logic circuit 475 which conditionally drives a conditional read/reset signal (e.g., TGc) back to the pixel column and also outputs read-enable and above/below-range bits (RE and AB) to primary buffer 421 of line memory 420. After pixel state assessment is complete for a given pixel row, the read-enable bit for each of K columns is passed, one after another via multiplexer 476, to the enable input of column-shared ADC (analog-to-digital converter) circuit 480 and to column-shared PGA 455, thereby selectively enabling digitization of individual column read-outs (i.e., according to the logic state of the selected RE bit), suppressing signal amplification and digitization (and thus conserving power) for pixels that are eclipsed, below the conditional read/reset threshold, or saturated. Multiplexer 477 is provided to demultiplex (i.e., distribute) digitized samples from column-shared ADC circuit 480 into respective per-column storage locations within the primary line-memory buffer 421 including, in the embodiment shown, overwriting the AB bit location.

Still referring to FIG. 10, pipelined operation within the various data read-out stages (i.e., pixel state assessment, conditional ADC, and line memory read-out) is enabled, at least in part, by multi-bank sample-and-hold circuitry 453. In the embodiment shown in detail view 454, for example, three separate sample-and-hold banks are provided for sequentially executed read-out operations, including an "Eclipse/Vt" bank 463 that stores pixel samples evaluated to detect eclipse events and determine whether the conditional read/reset threshold is exceeded (the latter referred to alternately as "Vt assessment" or conditional read/reset threshold assessment); an even-row conditional read S/H bank 465 (Conditional Read Bank 1) to store pixel samples that enable saturation detection and read-out digitization (ADC operation) for even-numbered pixel rows, and an odd-row conditional read S/H bank 467 (Conditional Read Bank 2) to store pixel samples that enable saturation detection and read-out digitization for odd-numbered pixel rows. As explained in greater detail below, by providing a separate (dedicated) Eclipse/Vt bank 463, S/H for the comparator operation can be pipelined with storage into the conditional read S/H banks Thus, by providing separate conditional read S/H banks for even and odd rows and alternately storing samples therein for eventual digitization within the column-shared ADC circuitry, it becomes possible to pipeline pixel state assessment and ADC operations from row to row.

Referring to detail view 482, an exemplary implementation of RE logic 475 includes shift register 483 to capture the output of comparator 472 following a sequence of per-row pixel assessment evaluations, latching each new assessment result (i.e., comparator output, including an eclipse flag, overthreshold flag and below-saturation flag) in response to a timing signal from the sensor control logic. Read/reset logic 485 evaluates the states of the eclipse and overthreshold (i.e., above Vt) flags when enabled by another timing signal (or state transition signal), asserting a conditional read/reset signal according to their states as discussed below. Similarly, Enable-ADC logic 487 outputs read-enable and above/below-range bits (RE) and (AB) for the pixel under evaluation in response to another control/timing signal and according to the states of the eclipse, overthreshold and below-saturation flags.

Figure 11:
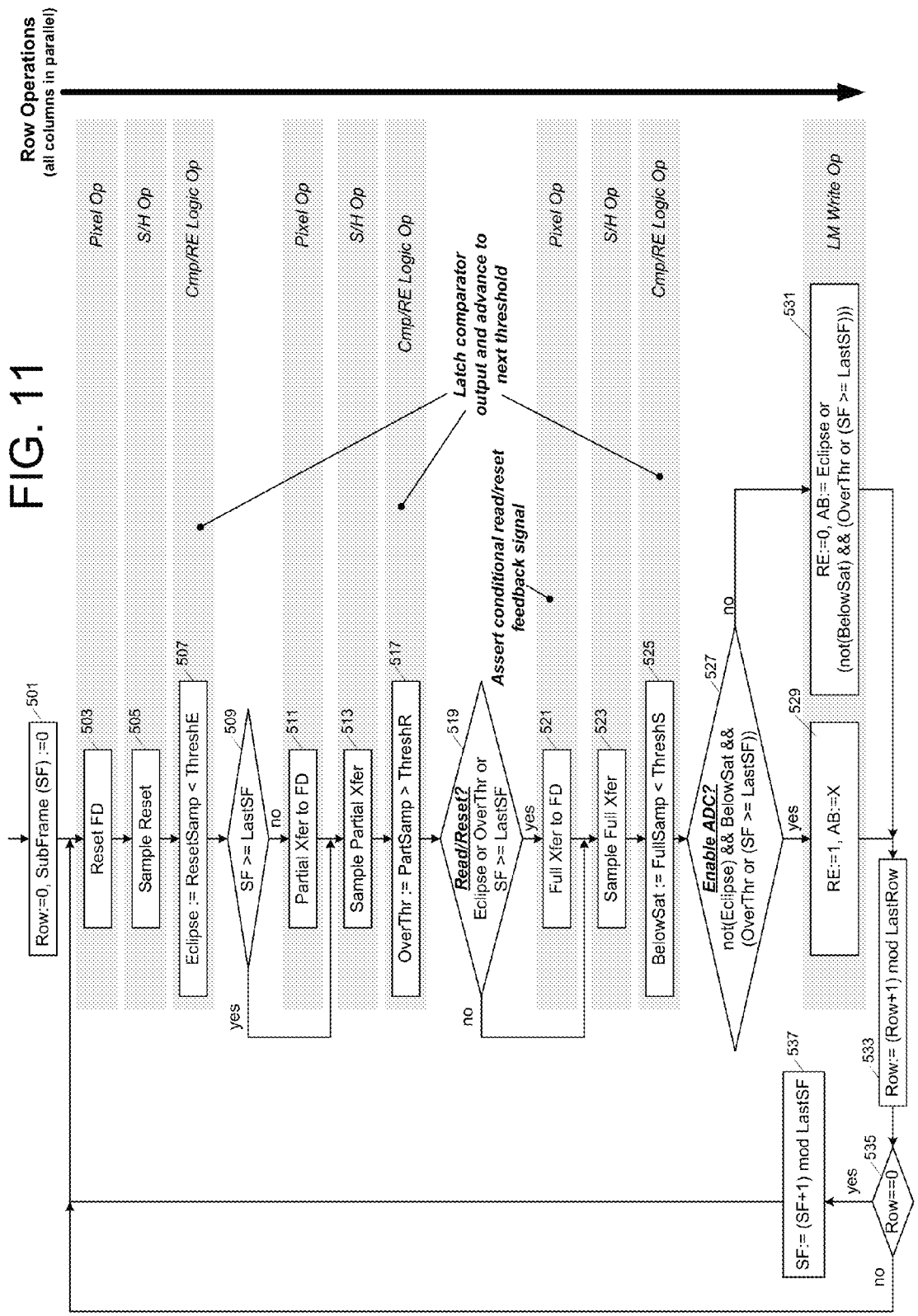
FIG. 11 illustrates a sequence of operations that may be executed within the pixel array, sample/hold banks and comparator circuitry of FIG. 10 to carry out pixel state assessment and enable subsequent ADC operation for row after row of pixels.

FIG. 11 illustrates a sequence of operations that may be executed within the pixel array, sample/hold banks and comparator circuitry of FIG. 10 to carry out pixel state assessment and enable subsequent PGA and ADC operation for row after row of pixels. In the implementation shown, each image frame is assumed to contain a sequence of conditional-read subframes that conclude with conditional read/reset operations, and a final unconditional-read subframe in which the integration states of pixels within the subject row are unconditionally read-out and, if no saturation or eclipse condition is detected, digitized to yield a subframe output. This approach of conditionally reading out pixel data during non-final subframes of a given image frame and then concluding the image frame with an unconditional read/reset operation is carried forward in a number of embodiments described below. In all cases, conditional read/reset operations may be carried out unconditionally (i.e., regardless of threshold comparison results) and unconditional read/reset operations may be replaced by conditional read/reset operations.

Starting at 501, row and subframe indices (Row, SF) are cleared to zero, followed by a three-phase pixel assessment operation involving, in order, the selected pixel row (i.e., row zero in the first loop iteration), the sample and hold circuitry, and the comparator/read-enable logic. More specifically, the floating diffusion (FD) is reset in a pixel operation at 503, a sample of the FD reset state is captured in the sample-and-hold circuitry at 505 and the reset-state sample is compared with an eclipse threshold at 507, with the result of the eclipse assessment being latched as a Boolean "Eclipse" flag (e.g., within RE shift register 483 of FIG. 10). If the subframe is not the last (final) subframe in the exposure interval (negative determination at 509), another three-phase pixel assessment operation is carried out to determine whether charge integrated within the pixel has exceeded the conditional read/reset threshold. Thus, a partial transfer from photodetector to floating diffusion is executed in a pixel operation at 511, a sample of the signal-state of the floating diffusion (enabling determination of whether a least a specified amount of charge was transferred during the partial-transfer operation) is captured within the sample and hold circuitry at 513, and the signal-state sample is compared within a conditional read/reset threshold (ThreshR) within the comparator circuitry at 517, with the result of the comparison being latched as a Boolean "OverThr" flag within the RE logic. In the embodiment shown, if the subframe is the final subframe (i.e., affirmative determination at 509), the partial transfer operation at 511 is bypassed, thus leaving the state of the photodetector undisturbed in preparation for an unconditional read operation (note that some other operating modes may have more than one unconditional read per row per frame). In one implementation, the sample and hold operation at 513 and the ThreshR comparison/OverThr latching operations at 517 are carried out regardless of whether partial transfer operation 511 is bypassed, thus simplifying control of the sample and hold circuitry and comparator/RE logic (i.e., the logic may operate the same way for each subframe so that no subframe-dependent control operation is needed with respect to the operations shown at 513 and 517). In alternative embodiments, the control logic may account for the final subframe condition and bypass the partial transfer sample operation 513 and/or comparator/read-enable logic operation 517.

Referring to the read/reset determination at 519, if either the Eclipse flag or OverThr flag is set (indicating that the subject pixel is in an eclipsed state and thus should be reset, or that sufficient charge has been integrated within the pixel to trigger conditional read and reset), or if the subframe is the final subframe in the integration interval (indicating that an unconditional read/reset is to be performed), then a full transfer from photodetector to floating diffusion is executed in the pixel operation at 521 (thus resetting the photodetector), followed by capture of the signal-state of the floating diffusion in a sample-and-hold operation at 523, and then a comparison of the signal-state sample with a saturation threshold (ThreshS) at 525, with the comparison result being latched as a Boolean "BelowSat" flag within the RE logic (a differential saturation test may be applied in alternative embodiments, comparing the difference between the signal-state sample and reset sample with the saturation threshold). Note that the floating diffusion of the pixel will be reset at 503 before further sampling so that the photodetector-to-floating diffusion charge transfer at 521 effectively resets the pixel. Thus, if the pixel is eclipsed, has integrated charge above the conditional read/reset level, or is being evaluated in the final subframe of an exposure interval (i.e., affirmative determination at 519), the pixel is reset. By contrast, if the pixel is neither eclipsed or overthreshold in a non-final subframe (negative determination at 519), the charge transfer operation at 521 is bypassed, thereby preserving charge within the photodetector to enable integration to continue into the next subframe. Note that the sampling operation at 513 and BelowSat comparison/result-latch at 517 may be omitted for eclipsed pixels in an alternative embodiment.

At 527, the OverThresh, BelowSat and Eclipse flags are evaluated together with the final-subframe indication to either enable or disable PGA and ADC operation with respect to the subject pixel, a selection effected by setting or clearing the RE bit in a line memory write operation at 529 or 531, respectively. More specifically, if the pixel state flags indicate that the pixel is not eclipsed and below the saturation threshold, and either (i) the subframe is the final subframe or the pixel state flags indicate that the partial read-out exceeded the conditional-read threshold (i.e., affirmative determination at 527), then PGA and ADC operation is enabled by setting the read-enable bit in a line memory write operation at 529. In that case, the value written to the AB bit, if any, is a don't care ('X') as the set RE bit will enable a subsequent ADC output to overwrite the AB bit. If the pixel state flags indicate that the pixel is either eclipsed or saturated, or does not exceed the conditional read/reset threshold (except in final subframe), or is not below the saturation threshold (i.e., negative determination at 527) then PGA and ADC operation is disabled by clearing the read-enable bit in a line memory write operation at 531. If ADC operation is disabled, the AB bit is written with a value that indicates whether the pixel state is saturated or eclipsed (AB:=1), or the pixel is underthreshold (AB:=0). Note that the expression shown in operation 531 reflects the particular implementation of the pixel assessment shown in FIG. 11 (i.e., OverThresh is meaningless if the pixel is eclipsed, and BelowSat is meaningless if Overthresh and Eclipse are both false in a non-final subframe) and may be different for a different pixel assessment sequence. Following the line memory write operation at 529 or 531, the row index is incremented by the scan sequencer at 533 in preparation for loop iteration with respect to the subsequent pixel row, rolling/resetting to row zero following loop iteration with respect to the final row in the sensor (for interleaved operation, row sequencing will not be sequential and the subframe index may change at each row). If a row reset occurs (i.e., affirmative determination at decision 535), the subframe index is incremented at 537 in preparation for subsequent subframe processing, rolling to zero if the just-processed subframe was the final subframe in an exposure. Note that depending on the pixel architecture and subframe exposure method, the next row may not be physically adjacent to the subsequent row.

Referring to FIGS. 10 and 11, in one embodiment, the comparator/RE logic operations shown at 507, 517 and 525, not only latch the comparator output within the RE logic (e.g., shifting the comparator result into shift register 483 of FIG. 10), but also advance the control input to reference multiplexer 470, thereby sequencing in order through the eclipse, conditional-read and saturation thresholds (ThreshE, ThreshR, ThreshS). While not specifically shown, the conditional reset and/or saturation thresholds may be changed from subframe to subframe, thus enabling subframe-specific thresholds to be applied according to subframe duration (i.e., setting a higher or lower conditional read threshold according to the subframe integration interval), programmable gain settings (i.e., aligning ThreshS with the signal level that will saturate the ADC for a given programmable gain setting), and/or any other factors.

Figure 12:
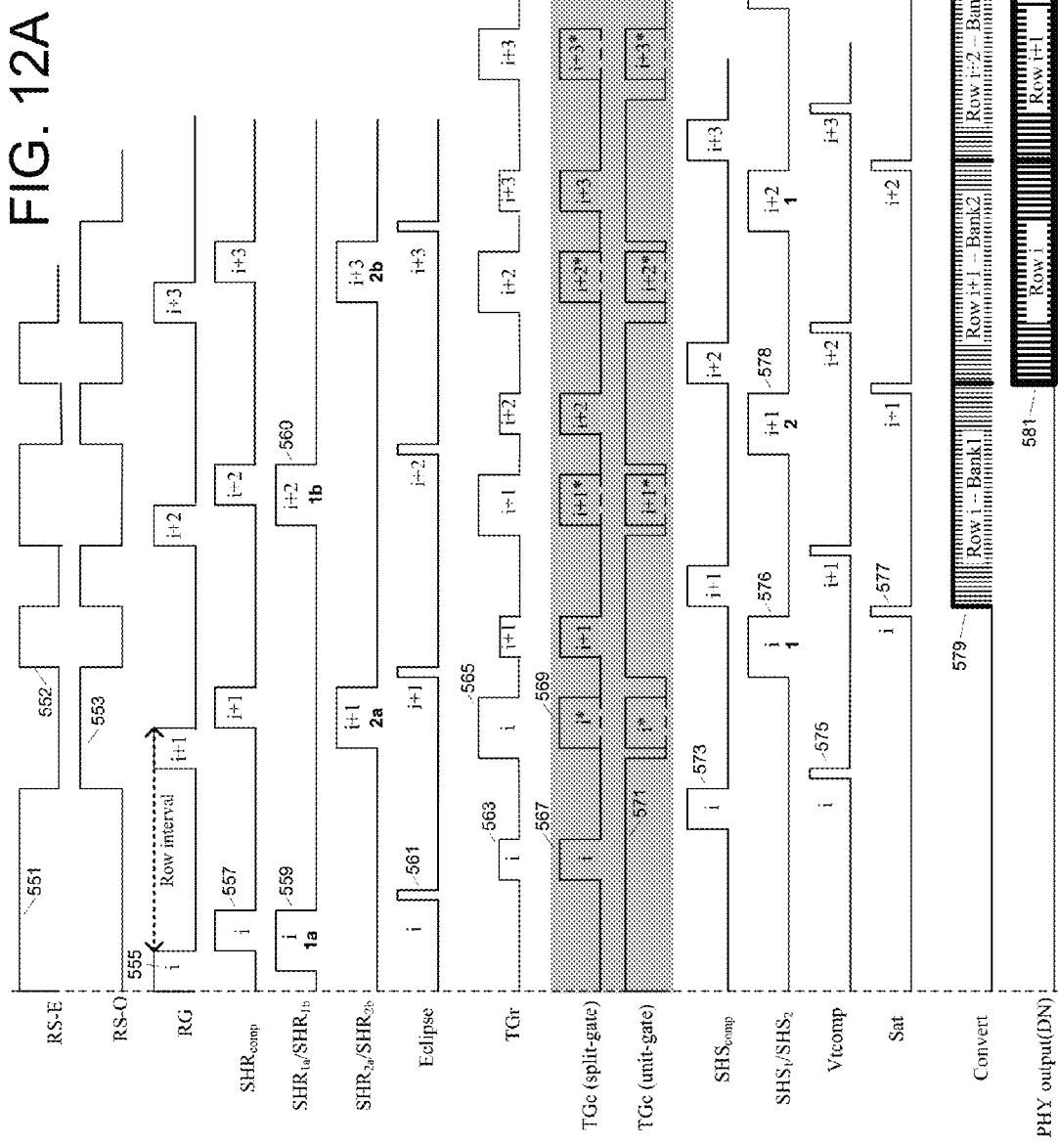
FIG. 12A illustrates an exemplary timing diagram in accordance with the sensor architecture of FIG. 10 and operational sequence of FIG. 11, including alternate TGc waveforms corresponding to split-gate and continuous-gate pixel array embodiments, respectively.
FIGS. 12B and 12C present exemplary read-out sequences that may be employed with respect to even and odd rows of pixels.

FIG. 12A illustrates an exemplary timing diagram in accordance with the sensor architecture of FIG. 10 and operational sequence of FIG. 11, including alternate TGc waveforms, "TGc (split-gate)" and "TGc (unit-gate)," corresponding to split-gate and continuous-gate pixel array embodiments, respectively. As noted above, the TGc waveforms for the two embodiments differ primarily in the TGc state during intervals of isolation between photodetector and floating diffusion. In the exemplary diagram of FIG. 12A, for instance, TGc is lowered in the split-gate embodiment to maximize the isolation between photodetector and floating diffusion, but held high in the continuous-gate embodiment for the same purpose (i.e., to ensure that the low state of the TGr line is applied to the transfer gate and thus avoid (or minimize) the floating transfer-gate condition.

FIGS. 12B and 12C present exemplary read-out sequences that may be employed with respect to even and odd rows of pixels. More specifically, FIG. 12B illustrates a non-shared pixel architecture where even and odd rows and pixels have a dedicated RS control and are read-out one after another, while FIG. 12C illustrates a shared pixel architecture in which each pair of pixels within a pixel column form a two-pixel cell (sharing a floating diffusion) and share a read-out line. In this arrangement, a first 2-row by 1-column shared pixel cell containing even-row pixels 'i' and 'i+2' and a second 2-row by 1-column shared pixel cell containing odd-row pixels 'i+1' and 'i+3' constitute a 4-row by 1-column region. A single row-select signal (RS-E) is provided for the first shared pixel cell (the even-row pixels) and another single row-select signal (RS-O) is provided for the second shared pixel cell (the odd-row pixels). The row readout order is as shown from top down (i.e., i, i+2, i+1, i+3) to avoid resource conflict with the shared floating diffusion region in the shared pixel cells. In general, the timing diagram of FIG. 12A, sample-and-hold circuitry described below in reference to FIG. 13 and sample-and-hold pipeline shown in FIG. 14 refer to the dedicated row-select embodiment of FIG. 12B. In all cases, the timing events and circuitry shown may be extended to cover the shared-read-out architecture of FIG. 12C or other shared read-out (shared floating diffusion and/or shared sample/hold circuitry) architectures, including 2×2 pixel-sharing readout architectures where each row readout may only be a half-row (even or odd columns) readout. Note also that "even" and "odd" readout refers to the use of the sample and hold registers and does not require that readout of an odd array row always follow an even array row—for interleaved readout where a row readout from one subframe is followed by a row readout from another subframe, the two row indices always may be spaced apart in the array and thus an even row could follow another even row in readout order, without causing a resource conflict.

In the timing example presented in FIG. 12A, interleaved pixel row operations are executed for even and odd pixel rows with the row operations for any single row corresponding to those shown in FIG. 11. More specifically, pixel reset, reset-state sample, eclipse assessment, partial transfer, signal-state sample and overthreshold (i.e., conditional read/reset threshold) assessment operations are executed with respect to even pixel row 'i' during an interval in which an even-row row-select signal (RS-E) is asserted as shown at 551, followed by pixel reset, reset-state sample and eclipse assessment operations with respect to odd pixel row 'i+1' during assertion of odd-row row-select signal (RS-O) at 553. Thereafter, RS-E is raised again at 552 to enable signal-state sample capture following a conditional read/reset operation in pixel i, with RS-O and RS-E thereafter being alternately enabled to permit interleaved (pipelined) reset-state and signal-state sampling operations with respect to the even and odd sample-and-hold banks. As discussed above, pixel reset is effected by assertion of a reset-gate signal (RG) as shown at 555 to couple the floating diffusions within a given row of pixels to a reset potential. Note that the pixel row index 'i' shown beneath the signal pulse in the signal RG waveform signifies a pulse on the RG signal line for row 'i', while pulse 'i+1' shown in that same waveform signifies a pulse on the RG signal line for row 'i+1' and thus the pulsing of a separate signal line—this indexed interpretation applies in a number of waveforms depicted in FIGS. 12A and 13.

Continuing with FIG. 12A, a row 'i' reset-state sample capture within the Eclipse/Vt S/H bank is triggered by assertion of $SHR_{comp}$ at 557, with $SHR_{1a}$ being simultaneously (559) asserted to capture a reset-state sample within the even row conditional read S/H bank, the latter sample to be applied during subsequent saturation assessment and, if enabled, ADC operation. An eclipse signal is pulsed at 561 to enable the $SHR_{comp}$ reset-state sample to be compared with an eclipse threshold (ThreshE) and latch the comparison result (e.g., within the RE logic as discussed above). Thereafter, at 567, TGc is pulsed (split-gate embodiment) or maintained high (continuous-gate embodiment) and TGr is concurrently raised to a partial-transfer potential (e.g., $VTG_{partial}$ as discussed above) at 563 to enable partial charge transfer from photodetector to floating diffusion, followed by an $SHS_{comp}$ pulse at 573 to capture a signal-state sample of the floating diffusion within the Eclipse/Vt sample-and-hold bank. In the case of a non-final subframe, Vtcomp is pulsed at 575 to compare the partial-transfer sample (i.e., the signal-state sample less the reset-state sample within the Eclipse/Vt sample-and-hold bank) with the conditional read/reset threshold (ThreshR) and latch the comparison result. As discussed above, the Vtcomp pulse may be suppressed in a subframe in view of a forthcoming unconditional read.

Still referring to FIG. 12A, the read-enable logic conditionally asserts the TGc signal at time 569 (i.e., if the conditional read/reset threshold is exceeded, the pixel is eclipsed or an unconditional read/reset is to be performed), concurrently with the full-transfer pulse 565 on the TGr line, thereby enabling charge integrated within the photodetector to be transferred in its entirety to the floating diffusion, resetting the photodetector in preparation for the next integration interval. $SHS_1$ is pulsed at 576 to capture the signal state of the floating diffusion within conditional read S/H bank 1, and at 577 a saturation signal is pulsed to enable the floating diffusion signal state less reset-state (the latter captured in response to the $SHR_{1a}$ pulse at 559, or alternately the floating diffusion signal state) to be compared with an appropriate saturation threshold (ThreshS). As discussed above, the combined pixel assessment results (i.e., eclipse, conditional read/reset and saturation assessments) may be recorded in line memory in the form of RE and AB bits, thus enabling column-sequential ADC operations to be carried out selectively according to the RE bit state for each individual pixel column. At 579, a convert signal is cycled K times (e.g., 48 times) per row read interval (e.g., 2.75 microseconds, though different row intervals may apply) to enable column-shared ADC operation, with the output of each individual pixel column (i.e., signal state less reset state amplified according to the gain selected within the programmable gain amplifier) being selectively/conditionally digitized according to the state of the corresponding RE bit. Digitized read-out values are stored within the line memory as described above, with the contents of the primary line memory buffer transferred to the secondary buffer and output via the PHY with a one row-interval latency as shown at 581.

The multi-bank sample-and-hold implementation shown in FIG. 11 and described in further detail below in reference to FIG. 13 becomes easier to understand in the context of FIG. 12A. More specifically, provision of separate even-row and odd-row conditional read S/H banks makes it possible to capture a signal-state sample of the full charge transfer from photodetector to floating-diffusion within the conditional read S/H bank for an odd pixel row (e.g., row i+1 as shown at $SHS_2$ pulse 578) concurrently with ADC operations with respect to prior-row pixel samples latched within the even-row conditional read S/H bank, and vice-versa. Similarly, because the reset-state sample captured within a given conditional read S/H bank is maintained for more than one row interval (i.e., to support Vt assessment as shown at 575, and ADC operation at 579, provision of two reset-state S/H elements, 'a' and 'b', per conditional read S/H bank makes it possible to pipeline those operations without resource conflict. This can be seen by the alternating assertion of signals $SHR_{1a}$ and $SHR_{1b}$ for even row reset-state samples (e.g., for samples i and i+2 as shown at 559 and 560) and, similarly, by the alternating assertion of signals $SHR_{2a}$ and $SHR_{2b}$ for odd row reset-state samples. Further, because the Eclipse/Vt assessment may be completed within a row interval, a single Eclipse/Vt S/H bank is sufficient to support operations in all rows.

FIG. 13 illustrates an embodiment of multi-bank sample-and-hold circuit 601 that may be used to implement the sample-and-hold (S/H) circuitry depicted in FIG. 10. As shown, the column read-out line for each of K pixel columns ($out_0$, $out_1$, . . . , $out_{K-1}$) is supplied to a respective per-column S/H circuit 621, each of which includes three sets of sample-and-hold elements (switch elements and storage elements) corresponding to the three sample-and-hold storage banks shown in FIG. 11, namely, an eclipse/Vt assess bank, and separate even and odd conditional read banks (i.e., Conditional Read Bank 1 and Conditional Read Bank 2). More specifically, as shown in detail view 622, a per-column component of the eclipse/Vt assess bank 625 includes two capacitive storage elements, $Cr_{comp}$, $Cs_{comp}$, coupled via switch elements 631 and 633 to control lines $SHR_{comp}$ and $SHS_{comp}$, respectively. By this arrangement, when either of the $SHR_{comp}$ or $SHS_{comp}$ signals is pulsed (e.g., as shown in FIG. 12A), the floating diffusion state driven onto column read-out line, Out (e.g., by a source follower transistor as described above), is captured within the corresponding capacitive element.

Still referring to FIG. 13, even-row conditional read S/H bank component 627 includes a pair of reset-state capacitive elements, $Cr_{1a}$ and $Cr_{1b}$, and corresponding switch elements 635, 637 (controlled by $SHR_{1a}$ and $SHR_{1b}$, respectively), and a signal-state capacitive element $Cs_1$ and corresponding switch element 639 controlled by $SHS_1$. Odd row S/H bank component 629 similarly includes reset-state capacitive elements, $Cr_{2a}$ and $Cr_{2b}$, and corresponding switch elements controlled by $SHR_{2a}$ and $SHR_{2b}$, respectively, and a signal-state capacitive element, $Cs_2$, and corresponding switch element controlled by $SHS_2$. As explained above, by providing separate reset-state capacitive elements within each conditional read S/H bank, it becomes possible to extend the interval for which a given reset-state sample is held (maintained) beyond two row intervals, and thus enabling pixel state assessment, conditional read/reset and selective ADC operations to be pipelined. FIG. 14 illustrates an exemplary sample and hold pipeline corresponding generally to the S/H bank usage intervals within the timing arrangement of FIG. 12A.

In an alternate embodiment (not illustrated) to FIG. 13, each per-column S/H bank includes a third Conditional Read Bank 3, and the three banks are alternated in a pipeline sequence similar to FIG. 14. Each of the three conditional read banks in this embodiment, however, only include one reset-state capacitive element. Thus the total number of switches and capacitive elements (6) needed for pipelined conditional read operations is the same as FIG. 13, although at least some aspects of operation may be simplified by this alternate arrangement.

FIG. 15 illustrates embodiments of a reference multiplexer 647, comparator input multiplexer 649 and comparator 651 that may be used to implement like-named components depicted in FIG. 10. In the embodiment shown, reference multiplexer 647 sequences through selection of three threshold references, including the eclipse, conditional-read and saturation thresholds discussed above (ThreshE, ThreshR, ThreshS). As mentioned, additional thresholds may be provided and selected to account for variation in programmable gain, reset threshold and so forth (e.g., from subframe to subframe and/or according to imaging settings). The comparator input multiplexer 649 includes a reset-state multiplexer 655 and signal-state multiplexer 657, as well as a single-ended/differential multiplexer 659 that enables selection between single-ended and differential outputs, the latter (i.e., difference between signal-state and reference-state selections) being generated by difference circuit 658.

In one embodiment, the eclipse evaluation is carried out by supplying $Cr_{comp}$ (i.e., the reset-state stored on capacitive element $Cr_{comp}$ within the eclipse/Vt S/H bank) in single-ended form to comparator 651 for comparison with ThreshE, and the saturation assessment can be similarly carried out by supplying $Cs_1$ or $Cs_2$ in single-ended form to comparator 651 for comparison with ThreshS. By contrast, conditional-read comparison is effected by selecting the differential between $Cs_{comp}$ and $Cr_{comp}$, and the saturation comparison by selecting the differential between $Cs_1$ and either of $Cr_{1a}$ and $Cr_{1b}$, or $Cs_2$ and either of $Cr_{2a}$ and $Cr_{2b}$. In alternative embodiments, any of the single-ended comparisons may be differential and vice-versa, in some cases simplifying the comparator input multiplexer circuitry (e.g., if no single-ended signals need be forwarded to comparator 651).

FIG. 16 illustrates embodiments of a column-shared programmable gain amplifier 685 and K:1 ADC input multiplexer 437 that may be deployed within the embodiment of FIG. 10. The ADC input mux includes a column multiplexer 669 and a set of K source-select multiplexers 667 (each including reset-state mux 671 and signal-state mux 673) that cooperate to enable column-by-column delivery of one of four signal-state/reset-state signal pairs ($Cs_1/Cr_{1a}$, $Cs_1/Cr_{1b}$, $Cs_2/Cr_{2a}$ or $Cs_2/Cr_{2b}$) to the differential input of programmable-gain amplifier 685. By this arrangement, after read-enable bits have been recorded to reflect the pixel state assessment for each of K columns, the source-select multiplexer can be set to select an even row or odd row input signal pair (e.g., alternating between $Cs_1/Cr_{1a}$ and $Cs_1/Cr_{1b}$ for every other even pixel row, and alternating between $Cs_2/Cr_{2a}$ and $Cs_2/Cr_{2b}$ for every other odd pixel row) and the K:1 column mux may be sequenced through the input sources from 0 to K−1 to support selective ADC operation.

In the embodiment shown, programmable gain amplifier 685 includes multiple stages of capacitively coupled differential amplifiers 693, each of which applies a programmable gain according to the ratio of an input capacitance 689 and feedback-coupled variable capacitance 691. In one implementation, shown in detail view 692, variable capacitance element 691 is implemented by switchably coupling a variable number of capacitive elements 699 in parallel with a minimum capacitance 697 in accordance with a program setting. In one embodiment, switchably coupled capacitive elements 699 are binary-weighted (capacitances=x, 2x, 4x, 8x, etc.) to enable $2^R$ different capacitance settings in accordance with an R-bit control value. Alternatively, capacitive elements 699 may be thermometer coded, have matching capacitances or any other arrangement that allows programmable gain amplifier to meet a desired amplification range and resolution. Also, the programmable gain amplifier may be disabled by opening gain-stage switch elements 687 in response to deassertion of a PGA enable signal (e.g., signal equivalent to or derived from the RE bits recorded within line memory 420 and supplied via multiplexing element 476 of FIG. 10). Also, any of the gain stages (only two of which are shown) may be bypassed according to programmed gain settings to further extend the amplification range of programmable gain amplifier 685. Note that various other programmable gain amplifier implementations may be used in alternative embodiments, including PGA implementations that are enabled and disabled per the RE flag bit to save power.

FIG. 17A illustrates embodiments of a read-enable multiplexer 711, ADC-enable logic 713 and ADC circuit 715 that may be used to implement the K:1 read-enable multiplexer and ADC circuitry of FIG. 10. As shown, read-enable multiplexer 711 is coupled to receive read-enable bits from each of K storage locations within primary line memory 421 (i.e., each location corresponding to a respective pixel column) and iteratively sequences through those locations to supply the read-enable bits, one after another, to the input of ADC-enable logic 713 (i.e., an AND logic gate in the embodiment shown) and also to the column-shared PGA (where they may serve as or enable generation of the PGA-enable signal described above). Referring to FIGS. 17A and 17B, a convert signal ("Convert") is cycled K times per pixel row to advance the read-enable bit selection (e.g., by incrementing a counter that controls the read-enable multiplexer selection), with the selected read-enable bit gating application of the convert signal to an enable input of ADC circuit 715. By this operation, the high-state of the convert signal either passes through or is blocked by logic gate 713 according to the state of the RE bit for that cycle of the convert signal, thereby either enabling or disabling operation of the PGA and ADC circuit according to the state of the RE bit. The ADC result for each read-enabled pixel column is stored within primary line memory buffer 421 for eventual output to the VLL circuitry and PHY. Though not specifically shown, a set of "store" strobes that enable the output of ADC 715 to be loaded into respective line memory buffer locations may be asserted in succession to enable successive (and selective) loading of ADC results into primary line memory buffer 421. Alternatively, the ADC results may be loaded into a shift register and then transferred in parallel to the line memory buffer, masking or otherwise preventing buffer load operations for those pixel columns in which the RE bit is not set.

Read-Out Dilation

When a color filter array is applied in connection with the conditional read/reset image sensors described above, image distortion may occur when a moving object triggers color-differentiated sampling operations—conditional read/reset operations in a given subframe within pixels for some colors, but not for adjacent pixels of other colors. For example, a moving object that triggers read-out operations in green pixels (i.e., pixels that receive light predominantly in the green wavelength band), but not adjacent red or blue pixels, may trigger relatively rapid read/reset operations within the green pixels while the blue and red pixels are infrequently read (or read on different subframes than the adjacent green pixels), thus producing artifacts in the finalized image. In a number of embodiments, such color artifacts are mitigated by modifying the conditional read/reset determination for a given pixel to account for the read/reset assessment for one or more neighboring pixels, in effect, expanding the number of pixels to be read/reset in response to an overthreshold determination with respect to a given pixel; an approach referred to herein as "read-out dilation" or "read dilation."

Figure 18:
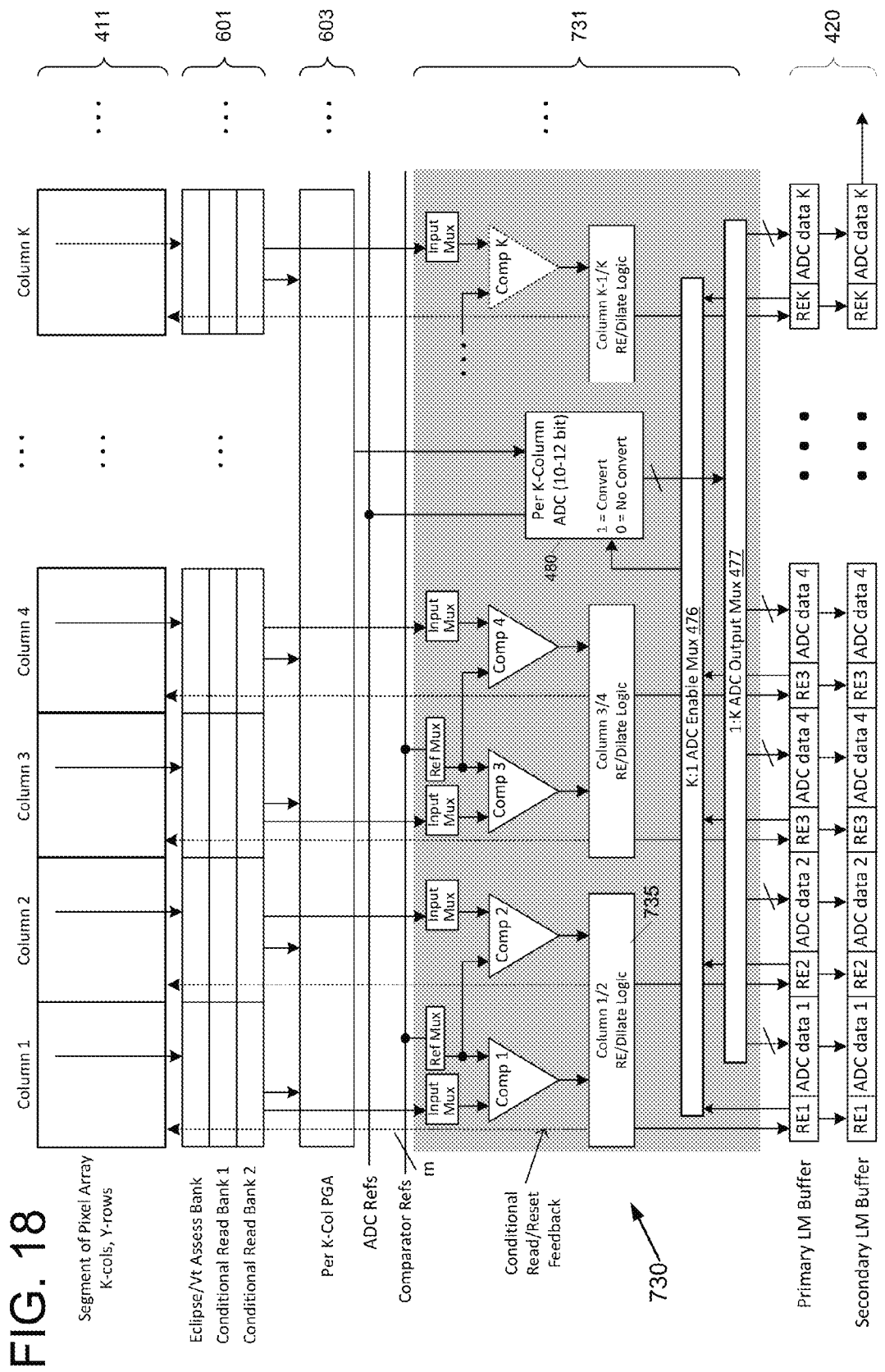
FIG. 18 illustrates an exemplary K-column section of an image sensor having logic to carry out read-dilation operations.

FIG. 18 illustrates an exemplary K-column section of an image sensor 730 having logic to carry out read-dilation operations. In the arrangement shown, the pixel array 411, multi-bank sample-and-hold circuitry 601, column-shared PGA 603, column-shared ADC circuitry 480, multiplexing circuits 476 and 477, and line memory buffers 420 are implemented generally as described in reference to FIGS. 16-23. Comparator circuitry 731 is also implemented generally as described in reference to FIG. 19, except that the per-column read-enable logic (element 475 of FIG. 10) is replaced by multi-column read-enable/dilation logic 735 coupled to receive the output of the comparators for multiple adjacent columns corresponding to pixels within the same read kernel (two adjacent columns and thus columns 1/2, 3/4, . . . , K–1/K, in the embodiment shown). By this arrangement, the read-enable bit determination for a given pixel may be based on the pixel assessment results and corresponding row flags for multiple column-adjacent and row-adjacent pixels.

In embodiments that allow interleaved operation between two or more subexposures, RE/Dilate Logic 735 is designed to save dilation state when switching row context from one subexposure to another. For instance, if four subexposure scans are interleaved, logic 735 retains four separate dilation states. When dilation state for a row x is complete, it is retained in an indexed set of registers while, e.g., dilation state for up to three unrelated rows is accessed for the next three row operations. On the fourth successive row operation, which visits row (x+1), the row x state is referenced to determine whether dilation requires pixel reads due to overthreshold state at row x.

Dilation may be neither necessary nor desirable in all modes of operation. Thus preferably, logic 735 has at least one dilate mode and at least one non-dilate mode (where every pixel is evaluated for readout completely independent of surrounding pixels). In some embodiments, dilation can also be activated on a subframe basis. For instance, only the longest subexposure(s) may use dilation, as that is where motion artifacts would be more apparent and/or problematic. Dilation logic 735 would in such case, when interleaving is used, allow state storage for each subexposure that indicates whether or not dilation applies each time a row is visited for that subexposure.

Figure 19:
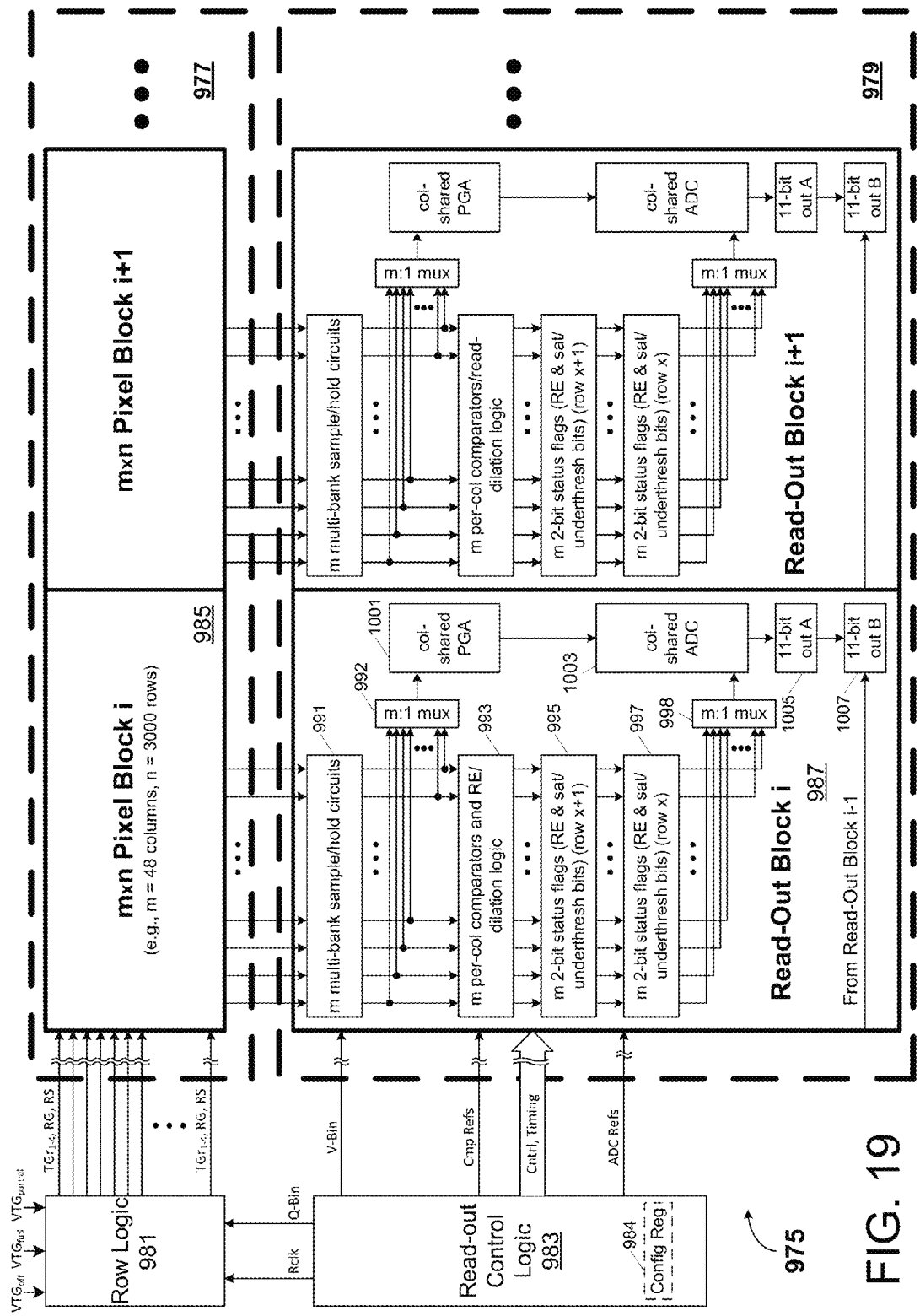
FIG. 19 illustrates an embodiment of an image sensor having a conditional read/reset pixel array, column read-out circuitry, row logic and read-out control logic.

FIG. 19 illustrates an embodiment of an image sensor 975 having a conditional read/reset pixel array 977, column read-out circuitry 979, row logic 981 and read-out control logic 983. In the example shown, pixel array 977 is organized in a number of pixel blocks 985, only two of which are depicted (i.e., pixel block 'i' and pixel block 'i+1'), with each pixel block containing m columns and n rows of pixels (e.g., m=48, n=3000, though other row/column dimensions may apply). Column read-out circuitry 979 is similarly organized in a number of read-out blocks 987 (only two of which are shown), each coupled to receive output signal lines (i.e., data lines) from a respective pixel block 985.

Though not specifically shown, each column of pixel array 977 is populated by shared-element pixels in which every four pixels form a quad pixel cell as described above, for example, in reference to FIG. 5. Similarly, though not shown, sample and hold circuitry within each read-out block includes switching elements to enable voltage-binning of same-color-plane pixels in different pixel columns as described in reference to FIG. 5. Thus, pixel array 977 may be selectively operated in charge-binned and/or voltage-binned read-out modes during all or selected subframes of an image frame interval in accordance with one or more binning control signals (e.g., "Q-Bin" and "V-Bin") from read-out control logic 983, thereby enabling partial binning operations as described above. In alternative embodiments, the disposition of shared floating diffusion and/or switchably shared sample and hold elements within the pixel and read-out blocks may be different from those shown in FIGS. 5 and 6 (e.g., 2×2 instead of 4×1 quad pixel groups).

Still referring to FIG. 19, row logic 981 outputs a shared row-select signal (RS) and reset-gate signal (RG) to each row of quad-pixel cells, and outputs independent row transfer-gate control signals ($TGr_1$-$TGr_4$) to drain terminals of respective transfer-enable transistors (or directly to transfer-gate terminals in a split-gate embodiment) within individual pixels. Thus, row logic 981 may be implemented with, i.e., one row-select and reset-gate signal per each group of four rows per the bin-capable option described above). In an implementation in which row decoder/driver 305 sequences incrementally through the rows of pixel array 977 (e.g., pipelining reset, integration and progressive read-out operations with respect to the rows of pixel array 977 such that one row is read-out after another), row logic 981 may include circuitry to assert the RG, RS and TGr signals at the appropriate time for each row, for example, synthesizing those signals with respect to a row clock (Rclk) from read-out control logic 983. Alternatively, row logic 981 may receive individual timing signals corresponding to each or any of the RG, RS and TGr signals, multiplexing any individual enable pulse onto the corresponding RG, RS, or TGr lines of a selected row at the appropriate time.

In one embodiment, row logic 981 receives transfer-gate control voltages corresponding to the off, partially-on and fully-on states shown in FIGS. 2, 3 and 4 (i.e., $VTG_{off}$, $VTG_{partial}$, $VTG_{full}$) from an on-chip or off-chip programmable voltage source, switchably coupling each of the different control voltages to a given transfer-gate row line at a deterministic time, for example, as shown in FIGS. 2, 6, 8, and 12A. The $VTG_{partial}$ voltage may be calibrated, for example, with a dark column of reference circuits included within pixel array 977 in one implementation, thus compensating for control-voltage and/or performance variations (i.e., non-uniformity) across the pixel array.

Continuing with FIG. 19, each read-out block 987 includes a set of m (per-column) multi-bank sample and hold circuits 991, a corresponding set of m comparators and read-enable/dilation logic circuits 993, m:1 multiplexers 992 and 998, column-shared programmable gain amplifier 1001 and column-shared ADC circuit 1003, all of which operate generally as described above in reference to FIG. 10. In contrast to the double-buffered, column-parallel line memory shown in FIG. 10, however, separate pairs of buffers are provided to store read-out status flags and ADC output values. More specifically, a pair of flag buffers 995 and 997 are provided to double-buffer per-column read-out status flags (i.e., a read-enable bit and an above/below range bit, RE and AB, for each of m pixel columns), with flag buffer 995 storing the status flags for row x+1, and flag buffer 997 storing status flags for row x, thus enabling status flag generation (i.e., threshold-comparison operations) with respect a given row (x+1) while the status flags for the prior row (x) are delivered one after another (via multiplexer 998) to column-shared ADC 1003 to support selective ADC operations as discussed above. Read-out control logic 983 (which may include a configuration register 984 to enable programmable selection of configuration options) outputs comparator references (Cmp Refs), control and timing signals (Cntrl, Timing) and ADC refs (ADC Refs) to the read-out blocks 987, together with the voltage-bin mode signal (V-Bin) mentioned above. Read-out control logic 983 may also output the above-described row clock (Rclk), as well as a charge-bin mode signal (Q-Bin) to row logic 981, thus enabling the sequencing logic therein to assert TGr signals in parallel or staggered fashion according to the specified charge binning mode.

Instead of storing m column ADC outputs in respective storage locations within a line memory (i.e., as in the embodiment of FIG. 10), and then shifting out a sequence of ADC values corresponding to an entire pixel row, a single-column ADC output storage buffer pair 1005/1007 (i.e., an 11-bit storage element in this case to permit storage of a 10-bit ADC value and logic '1' read-enable flag or a logic '0' read-enable flag together with an AB flag) is provided to enable double-buffering of ADC values generated in succession for respective pixel columns. More specifically, output-stage buffer 1007 is provided to store the ADC value for a given pixel column and deliver that ADC value to downstream logic (including the PHY), concurrently with generation of the ADC value for a subsequent pixel column and storage of that subsequent-column ADC value in input-stage buffer 1005. In the embodiment shown, the output-stage buffers 1007 for respective read-out blocks 987 are coupled in an output shift register to enable sequential output of per-block ADC output values (e.g., at a rate of PB times the per-column ADC output rate, where PB is the number of pixel blocks in the pixel array) to downstream logic. Consequently, the stream of ADC output values delivered to downstream logic (including circuitry within an off-chip image processor) are column interleaved, with each set of K ADC output values including single value from each of K pixel blocks (with m sets of K ADC output values being output in sequence). In alternative embodiments, the output-stage buffers or any number of groups of output buffers may deliver output values in parallel to downstream logic instead of delivering one pixel column read-out result at a time.

Figure 20:
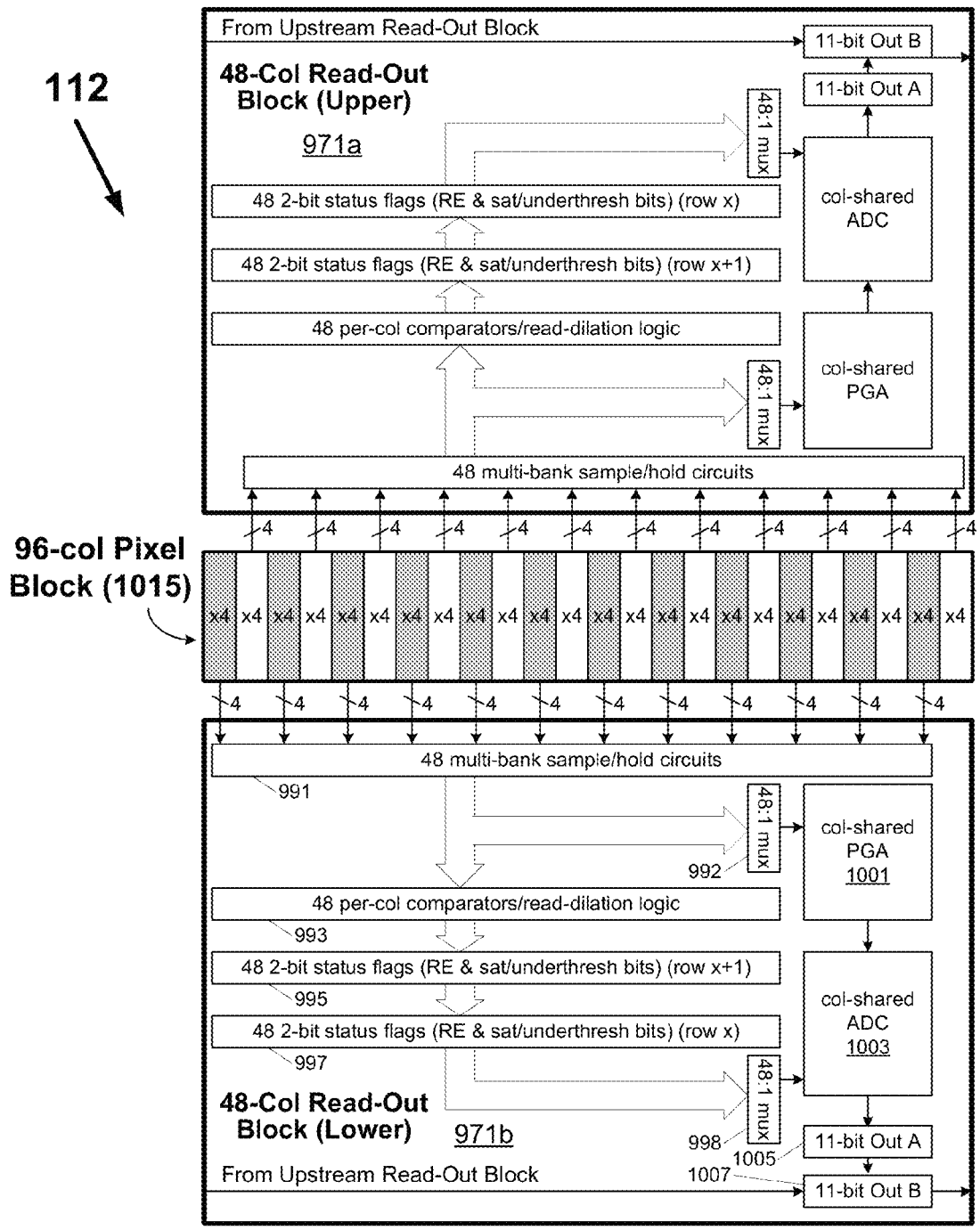
FIG. 20 illustrates an exemplary image sensor architecture in which each pixel block of a pixel array is sandwiched between upper and lower read-out blocks.

FIG. 20 illustrates an exemplary image sensor architecture 112 in which each pixel block 1015 of a pixel array is sandwiched between upper and lower read-out blocks 971a and 971b. In the embodiment shown, pixel block 1015 includes 96 pixel columns, alternately connected to upper and lower read-out blocks every four pixel columns (i.e., four-up, four-down) so that 48 pixel columns are coupled to each of the upper and lower read-out blocks 971a/971b. The four-up, four-down implementation is advantageous for at least some of the disclosed embodiments as it provides a relatively straightforward way to move from column read-outs at the pixel pitch to sample-and-hold elements, etc., laid out at twice the pixel pitch. Other implementations are possible, depending on binning layout, ADC sharing, etc. Each of the upper and lower read-out blocks 971a/971b is implemented generally as described in reference to FIG. 19, thus doubling the net data output rate (i.e., by virtue of the parallel operation of the read-out blocks) and also enabling disposition of PHY (physical interface circuitry) at opposite edges of an integrated circuit. Alternatively, the output buffer stages 1007 of the upper and lower read-out blocks may feed a shared physical output driver (PHY), for example, disposed to the left or right of the pixel array and coupled to receive data in parallel from each of the digital line memories. Additional circuitry (e.g., compression circuitry, reconstruction circuitry, etc.) may be disposed between the output buffer stages and shared or respective PHYs as generally described above. Also, while the upper and lower read-out blocks may be implemented on the same physical die as pixel block 1015 (e.g., at the periphery of the die (sandwiching the pixel block) or in the center of the die between respective halves of the pixel array, the read-out blocks may alternatively be located on another die (e.g., coupled to the pixel array die in a stacked configuration that may additionally include other imaging-related dies).

Power-Saving Readout Architecture

Figure 21:
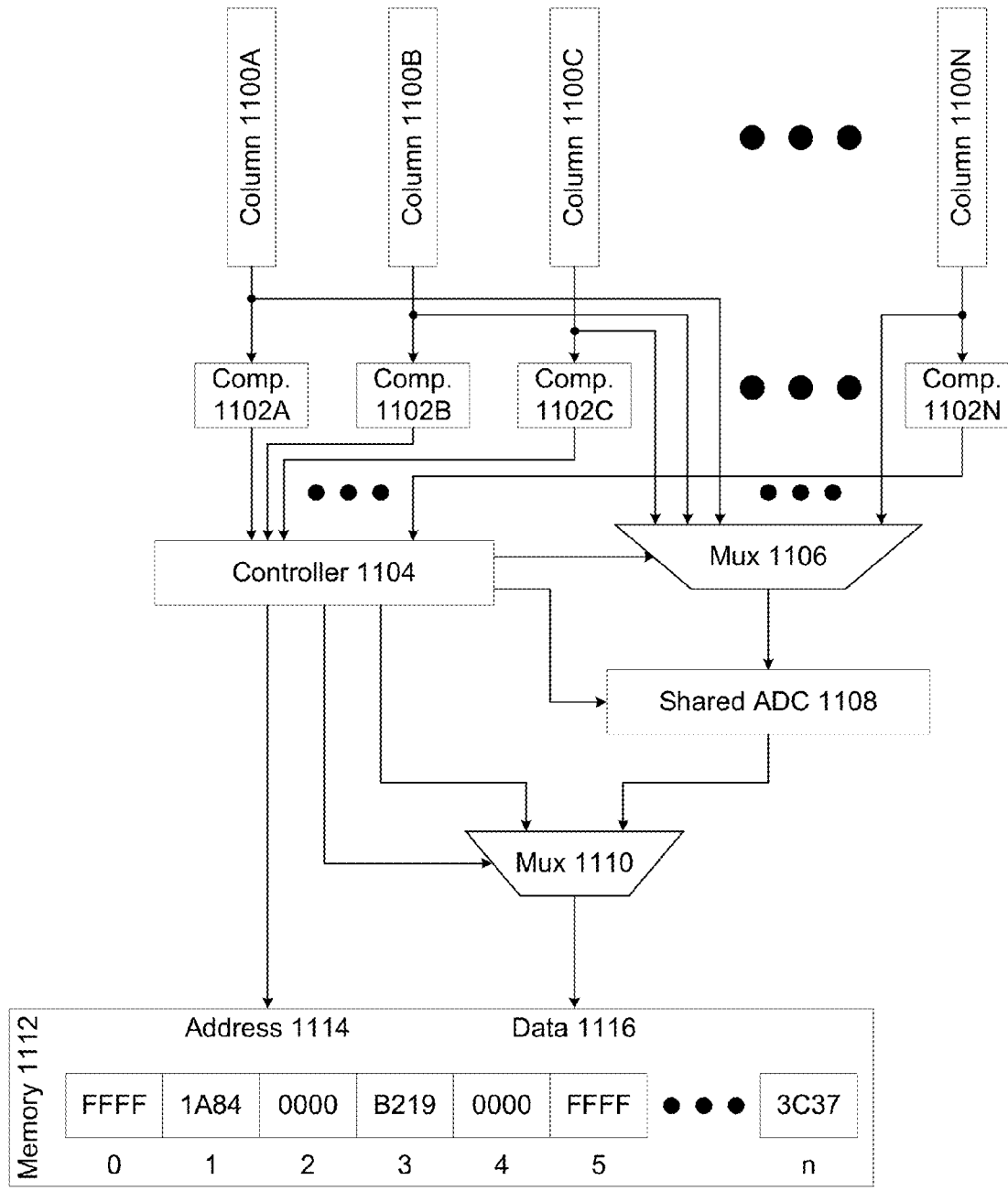
FIG. 21 illustrates a power-saving readout circuit architecture for an image sensor.

FIG. 21 illustrates a power-saving readout circuit architecture for an image sensor, such as the image sensor 451 of FIG. 10. Columns 1100A-1100N each include one or more pixels in a pixel array, and can represent a pixel array row, a partial row, or any other arrangement of pixels. Each of columns 1100A-1100N is associated with a corresponding comparator of comparators 1102A-1102N. The comparators are each configured to compare a sample representative of a charge stored by a pixel of a corresponding column to one or more thresholds. For instance, each comparator can compare the sample to a conversion threshold (or conditional-read threshold) and a saturation threshold. If the sample is less than the conversion threshold, the comparator can classify the pixel as a below threshold pixel. If the sample is greater than or equal to a saturation threshold, the comparator can classify the pixel as a saturated pixel. Finally, if the sample is greater than or equal to the conversion threshold but less than the saturation threshold, the comparator can classify the pixel as an above threshold pixel. It should be noted that although comparators are illustrated in the embodiment of FIG. 21, other embodiments can use classifiers or any other suitable component configured to set a flag for above threshold pixels. In some embodiments, the comparator architecture of the image sensor 730 of FIG. 18 can be incorporated into the power-saving readout circuit architecture of FIG. 21 to perform the pixel classification described herein.

Still referring to FIG. 21, the readout circuit architecture includes a controller 1104 configured to receive pixel classifications from the comparators 1102A-1102N, and to provide a control signal to a multiplexer 1106 coupled to each of columns 1100A-1100N based on the pixel classifications. For pixels classified as above threshold pixels, the controller 1104 configures the multiplexer 1106 to output the samples corresponding to such pixels to a shared ADC 1108 (typically also including a preamplifier) for conversion. For example, if the comparator 1102C classifies a pixel within column 1100C as an above threshold pixel, the controller 1104 configures the multiplexer 1106 to output the sample representative of the charge stored by the pixel to the shared ADC 1108 for conversion into a converted pixel signal. Note that for some operating modes, some or all comparator outputs can be ignored or given other meanings by controller 1104. For instance, in an unconditional read of data from all columns, controller 1104 may simply consider all comparators as above threshold. In a binned mode, only one comparator may be used for each set of binned columns, resulting in some comparisons (and conversions) being skipped. And with read dilation, multiple comparators may crossfeed between adjacent columns and/or rows such that one comparison being over threshold may cause another pixel(s) to be converted, even if the other pixel evaluates below threshold.

Continuing with FIG. 21, the controller 1104 is configured to operate the shared ADC 1108 for a power-on period, during which the shared ADC is configured to convert the samples associated with above threshold pixels in a set of pixels to be read out into digital signals representative of the charge stored with the above threshold pixels. The length of the readout period is sufficient to perform ADC operations for an entire set of pixels that are assigned to ADC 1108 and that are sampled together. The length of the power-on period within the readout period can vary with the number of pixels within the set of pixels in a readout period that are classified as above threshold pixels. During the readout of the set of pixels, the controller 1104 operates the shared ADC 1108 during the readout of the pixels classified as above threshold pixels, and preferably powers down the shared ADC during the remainder of the readout period. For instance, during the readout of a row of pixels, if half of the pixels in the row are classified as above threshold, the shared ADC 1108 is configured to convert the above threshold half in a contiguous half of the readout period, generally without regard to how the to-be-converted pixels are physically distributed in the set, and the ADC is powered down during the remainder of the readout period, beneficially saving bias current and other power otherwise required to operate the shared ADC and its preamplifier. The power-on period can be at the beginning of a readout period for a set of pixels, the end of the readout period, or during any other portion or portions of the readout period.

Still referring to FIG. 21, the controller 1104 is configured to output pre-determined values for pixels classified as below threshold pixels or saturated pixels. For instance, the controller 1104 is configured to output a zero pixel value for below threshold pixels and a saturated pixel value for saturated pixels. The zero pixel values and the saturated pixel values output by the controller 1104 and the converted pixel values output by the shared ADC 1108 are received at a multiplexer 1110. The controller 1104 is further configured to provide a control signal to the multiplexer 1110 to configure the multiplexer to output zero pixel values and saturated pixel values for below threshold pixels and saturated pixels, respectively, and to configure the multiplexer to output converted pixel values from the shared ADC 1108 for above threshold pixels. The multiplexer 1110 outputs pixel values to a data input 1116 of a memory 1112. For each pixel value corresponding to a pixel in a pixel array received by the memory 1112, the controller 1104 provides a corresponding memory address to the address input 1114 of the memory. In the embodiment of FIG. 21, zero pixel values are stored by the memory 1112 for below threshold pixels corresponding to memory addresses 2 and 4, saturated pixel values are stored by the memory for saturated pixels corresponding to memory addresses 0 and 5, and converted pixel values are stored by the memory for above threshold pixels corresponding to memory address 1, 3, and n. For the to-be-converted pixels to be converted during a contiguous conversion period, data will not generally be written to contiguous addresses during the conversion period.

Figure 22:
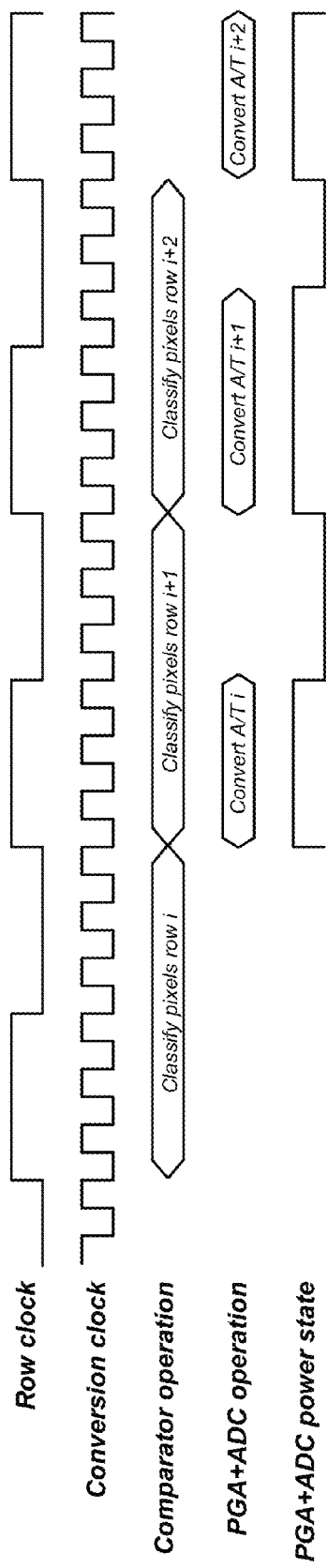
FIG. 22 is a timing diagram illustrating the power state of a PGA and ADC during the readout of pixel values in an image sensor.

FIG. 22 is a timing diagram illustrating the power state of a PGA and ADC during the readout of pixel values in an image sensor with the readout circuit architecture of FIG. 21. Pixels in row i of a pixel array are classified by a comparator over a first row clock cycle, pixels in row i+1 are classified by the comparator in a second row cycle, and pixels in row i+2 are classified by the comparator in a third row cycle. After the pixels in each row are classified, the PGA and ADC power on and convert the samples associated with above threshold pixels, e.g., during the next row cycle. In the embodiment of FIG. 22, the PGA and ADC convert the above threshold pixels of row i over three conversion clock cycles, the above threshold pixels of row i+1 over four conversion clock cycles, and the above threshold pixels of row i+2 over three conversion clock cycles. Such an embodiment indicates a greater number of above threshold pixels in row i+1 than in rows i and i+2.

In some embodiments, instead of outputting individual zero pixel values and saturated pixel values, the controller 1104 compresses zero pixel values and/or saturated pixel values and outputs the compressed pixel values. Zero pixel values and saturated pixel values are generally readily compressible due to the format of zero pixel values and saturated pixel values. Compressing zero pixel values and saturated pixel values reduces the total amount of data being output by the controller 1104, which can beneficially decrease the amount of power required to output such pixel values. In some embodiments, the controller 1104 compresses zero pixel values and/or saturated pixel values using Huffman coding, for instance by assigning shorter prefix codes to sequences of zero pixel values and/or saturated pixel values, and by assigning longer prefix codes to above threshold pixel samples converted by the ADC 1108. In other embodiments, the controller 1104 can implement other types of compression, such as other types of variable-length encoding, dictionary-based encoding, lossless encoding, or any other suitable type of compression.

Figure 23:
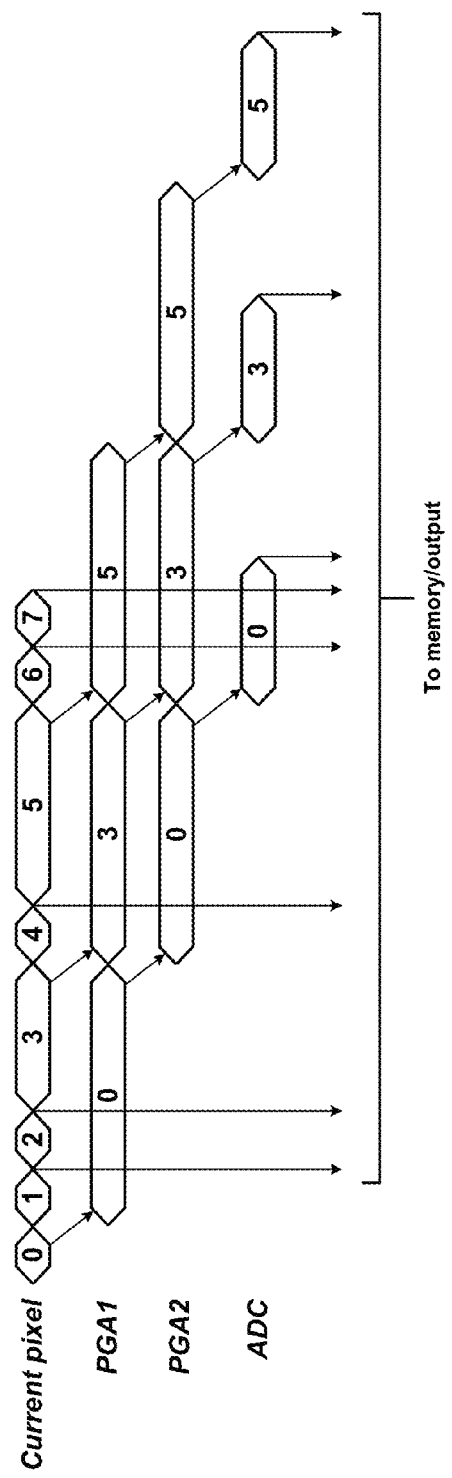
FIG. 23 is a timing diagram illustrating the readout of pixel values in an image sensor.

FIG. 23 is a timing diagram illustrating further details the readout of pixel values in an image sensor with the readout circuit architecture of FIG. 21 and a two-stage PGA, e.g., as shown in FIG. 16. In the embodiment of FIG. 23, a set of pixel values is read out for writing to memory. Pixels 0, 3, and 5 are above threshold pixels, and pixels 1, 2, 4, 6, and 7 are either below threshold pixels or saturated pixels. The controller operates with a pixel clock, while PGA1, PGA2, and ADC operate as a pipeline with a slower conversion clock, e.g., at a subfrequency of the pixel clock. At a first pixel clock, pixel 0 is examined by the controller and is scheduled for conversion. Accordingly, at a next clock edge amplification of a sample associated with pixel 0 is begun by a first PGA stage, PGA1. As samples associated with pixels 1 and 2 are not converted by the ADC, pixel values (such as zero pixel values and saturated pixel values) associated with pixels 1 and 2 are immediately output to memory on subsequent pixel clocks, without waiting for the PGA1 to finish amplifying the sample associated with pixel 0. As pixel 3 is above threshold and must be scheduled for conversion, the input pixel pointer in the controller stalls to wait for PGA1 to transfer its output to the second PGA stage, PGA2.

A sample associated with above threshold pixel 3 is supplied for amplification by PGA1 upon the completion of the amplification of the sample associated with pixel 0 by PGA1 and the transfer of an amplified pixel 0 sample to stage PGA2. The sample associated with pixel 0 is further amplified by PGA2. While PGA1 amplifies the input pixel 3 sample and PGA2 further amplifies the pixel 0 sample, a pixel value associated with pixel 4 (either a below threshold pixel or a saturated pixel) is immediately output to memory. A sample associated with above threshold pixel 5 requires scheduling for conversion, and the input pixel pointer again stalls until the next conversion clock cycle. The pixel 5 sample is amplified by PGA1 upon the completion of the amplification of the sample associated with pixel 3 by PGA1, which amplified sample in turn is amplified by PGA2 upon the completion of the amplification of the sample associated with pixel 0 by PGA2, which twice-amplified sample in turn is converted by the ADC into a converted pixel value and output. Samples associated with pixels 6 and 7 do not need to be converted by the ADS, and pixel values associated with pixels 6 and 7 are output while samples associated with pixels 0, 3, and 5 are still in the ADC pipeline. Note that by defining an ADC output time that does not conflict with any possible ADC bypass output time, ADC writes to memory can be interspersed with bypassed writes to memory. The sample associated with pixel 3 is converted into a converted pixel value and output by the ADC after amplification by PGA2 is finished. Likewise, the amplified sample associated with pixel 5 is amplified a second time by PGA2 after the amplification of the sample associated with pixel 3 is finished, and is converted into a converted pixel value and outputted by the ADC after the amplification by PGA2 of the sample associated with pixel 5 is finished. It should be noted that although the pixel values associated with pixels 0-7 are outputted non-sequentially, the outputted values can be written to corresponding locations within memory such that pixel values associated with all eight pixels are stored sequentially. Although this example shows the controller stalling each time it encounters a pixel that needs conversion, other circuit arrangements can work differently, e.g., by building a list of addresses for conversion, asserting convert signals that the ADC takes up in turn, etc.

Figure 24:
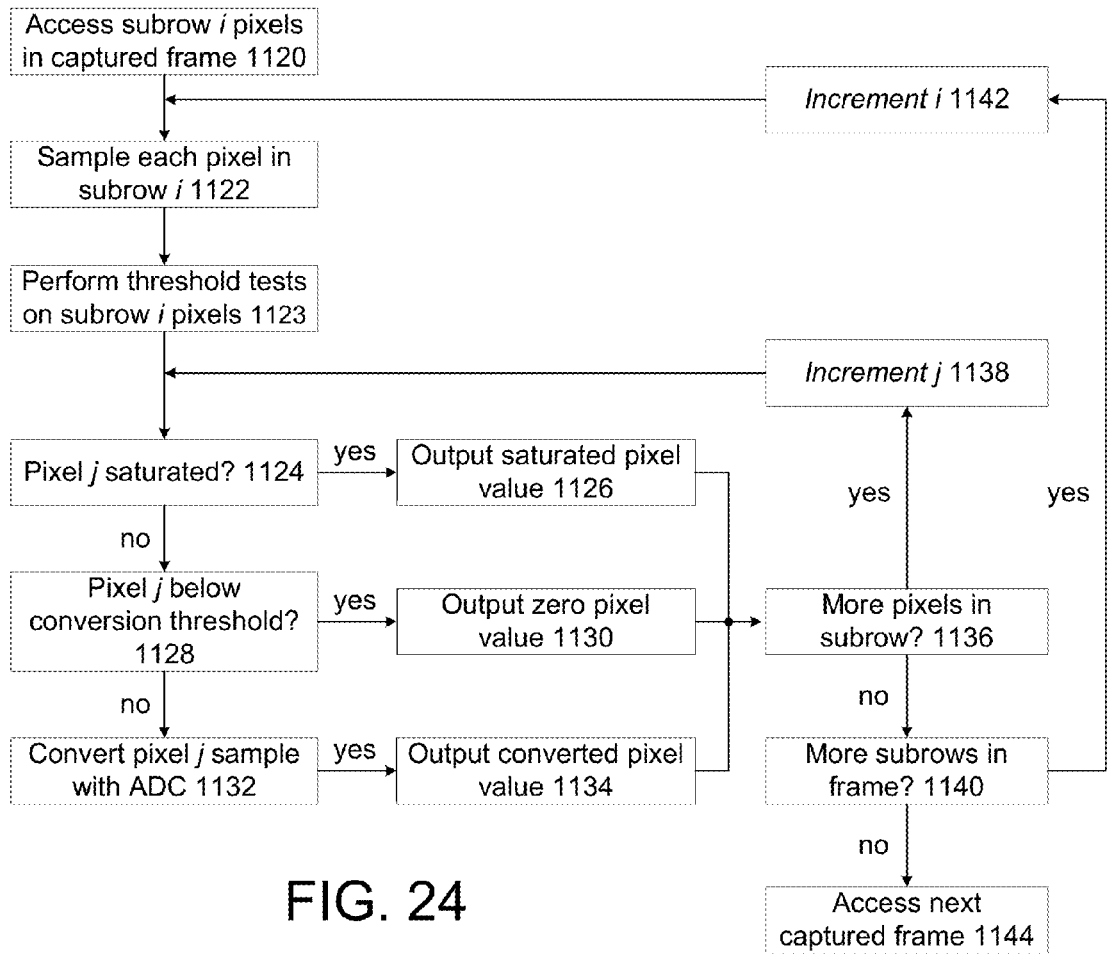
FIG. 24 is a flow chart illustrating the readout of pixel values for each row in an image sensor.

FIG. 24 is a flow chart illustrating the readout of pixel values for each subrow in an image sensor with the readout circuit architecture of FIG. 21. A subrow i of pixels in a captured frame is accessed 1120, and each pixel in the subrow i is sampled 1122. In some embodiments, the subrow i is an entire row of pixels, while in others, i is a portion of the row of pixels less than the entire row corresponding to a shared ADC. In some of the illustrated embodiments, an entire row i is sampled simultaneously, but subrows of the row are handled in parallel by different ADC/conversion circuitry, each responsible for its section of the row. Threshold tests are performed 1123 for each sampled pixel in subrow i by comparing each pixel sample to a saturation threshold and a conversion threshold. In response, a flag can be set for each tested pixel indicating that the pixel is saturated, below the conversion threshold, or between the saturation threshold and conversion threshold.

The sample associated with pixel j in subrow i is compared to a saturation threshold to determine 1124 if the pixel j is a saturated pixel. In response to a determination that the pixel j is saturated, a saturated pixel value is outputted 1126. In response to a determination that the pixel j is not saturated, the sample associated with pixel j is compared to a conversion threshold to determine 1128 if the pixel j is a below threshold pixel. In response to a determination that the pixel j is a below threshold pixel, a zero pixel value is outputted 1130. In response to a determination that the pixel j is not a below threshold pixel, the sample associated with pixel j is converted 1132 with an ADC, and a converted pixel value is outputted 1134. The various threshold tests may occur in other orders, and each threshold test is typically carried out simultaneously for all pixels in a subrow, with flag values stored in parallel for later output. One flag value can signify convert/no convert, and another flag can specify a no convert reason (e.g., below threshold, saturated/eclipsed).

In response to a determination 1136 that there are additional pixels within the subrow i, the index j is incremented 1138, a pixel value is determined based on steps 1124-1134, and the process is repeated until there are no remaining pixels in subrow i. In response to a determination 1140 that there are more subrows of pixels in the captured frame for conversion, the index i is incremented 1142, and the process of steps 1122-1140 is repeated until there are no remaining subrows in the capture frame. In response to a determination that there are no more subrows in the captured frame, a subsequent captured frame is accessed 1144, and the process of steps 1120-1140 is repeated. Note that as some operational modes interleave subframe captures, after each subrow another subframe may next be serviced, with the subframes each serviced once before returning to the current subframe and incrementing i.

Figure 25:
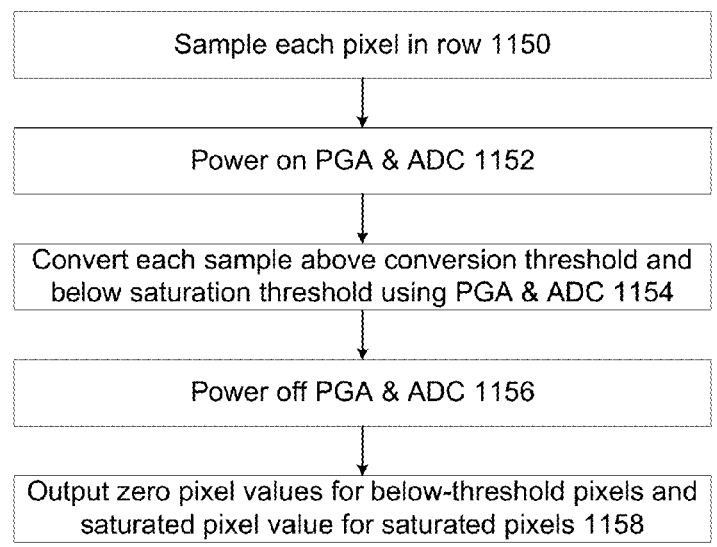
FIG. 25 is a flow chart illustrating the readout of pixel values in an image sensor row.

FIG. 25 is a flow chart illustrating the readout of pixel values in an image sensor row of an image sensor with the readout circuit architecture of FIG. 21. Each pixel in a row is sampled 1150. A different PGA and ADC are powered on 1152 for each group of pixels in a respective subrow portion of the row (such as the shared PGA and ADC associated with each subset of columns as illustrated in FIG. 19), and for each group, each sample greater than or equal to a conversion threshold but less than a saturation threshold is converted 1154 by the PGA and ADC (in one mode, although unconditional read, read dilation, and binning modes are other possibilities). The PGA and ADC are powered off 1156 for the remainder of the row time. Zero pixel values and saturated pixel values are output 1158 for below threshold pixels and saturated pixels, respectively. Although FIGS. 24 and 25 are described in terms of pixel rows and subrows, it should be noted that the processes described herein apply equally to any set or organization of pixels.

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific numbers of bits, signal path widths, signaling or operating frequencies, component circuits or devices and the like can be different from those described above in alternative embodiments. Additionally, links or other interconnection between integrated circuit devices or internal circuit elements or blocks may be shown as buses or as single signal lines. Each of the buses can alternatively be a single signal line, and each of the single signal lines can alternatively be buses. Signals and signaling links, however shown or described, can be single-ended or differential. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device "programming" can include, for example and without limitation, loading a control value into a register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "light" as used to apply to radiation is not limited to visible light, and when used to describe sensor function is intended to apply to the wavelength band or bands to which a particular pixel construction (including any corresponding filters) is sensitive. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

The section headings in the above detailed description have been provided for convenience of reference only and in no way define, limit, construe or describe the scope or extent of the corresponding sections or any of the embodiments presented herein. Also, various modifications and changes can be made to the embodiments presented herein without departing from the broader spirit and scope of the disclosure. For example, features or aspects of any of the embodiments can be applied, at least where practicable, in combination with any other of the embodiments or in place of counterpart features or aspects thereof. Accordingly, the specification and drawings are to be regarded in an illustrative rather than a restrictive sense.

What is claimed is:

1. An integrated-circuit image sensor comprising:
  a pixel array comprising a plurality of pixels, each readable through at least one corresponding pixel readout circuit;
  conditional read circuitry for a selected subgroup of the pixels and corresponding pixel readout circuits, to determine whether any of the subgroup of pixels are selected for readout, and perform a corresponding selection for parallel conditional full pixel sampling of the selected pixels in the subgroup for readout;
  an Analog-to-Digital Converter (ADC); and
  a controller configured to, for the selected subgroup of pixels:
    operate the ADC during a power-on period, where the length of the power-on period varies in relation to the number of parallel conditional full pixel samplings performed by the conditional read circuitry, and
    select samples corresponding to those pixels in the subgroup of pixels with conditional full pixel sampling for serial conversion by the ADC during the power-on period.

2. The integrated-circuit image sensor of claim 1, wherein the conditional read circuitry comprises:
  a plurality of comparators operable in a parallel readout operation, each comparator in a first parallel operation associated with at least one sample from a different selected pixel readout circuit, each comparator configured to:

access a sample from the selected readout circuit; and
determine whether a charge associated with a pixel corresponding to the accessed sample is less than a conversion threshold based on the accessed sample.

3. The integrated-circuit image sensor of claim 2, wherein the controller is further configured to output a zero pixel value for the pixel in response to a determination by one of the comparators that the charge associated with the pixel is less than the conversion threshold.

4. The integrated-circuit image sensor of claim 2, wherein each comparator is further configured to:
determine whether a charge associated with the pixel corresponding to the accessed sample is greater than or equal to a saturation threshold based on the accessed sample.

5. The integrated-circuit image sensor of claim 4, wherein the controller is further configured to output a saturation pixel value for the pixel in response to a determination by one of the comparators that the charge associated with the pixel is greater than or equal to the saturation threshold.

6. The integrated-circuit image sensor of claim 4, wherein the controller is further configured to, for each pixel based on the output of the corresponding comparator:
determine whether a charge associated with the pixel corresponding to the accessed sample is greater than or equal to the conversion threshold and less than the saturation threshold based on the accessed sample; and
select the pixel for readout if the charge associated with the pixel is greater than or equal to the conversion threshold and less than the saturation threshold.

7. The integrated-circuit image sensor of claim 1, wherein the controller is further configured to, for the selected subgroup of pixels:
operate an amplifier during the power-on period, the amplifier configured to amplify the selected samples corresponding to the pixels in the subgroup of pixels before the samples are converted by the ADC.

8. A method comprising:
selecting a subset of pixels in a pixel array comprising a plurality of pixels for readout, each pixel in the subset readable through at least one corresponding pixel readout circuit;
performing a parallel conditional full pixel sampling for each of the selected subset of pixels;
operating an ADC during a variable power-on period of a readout period, where the length of the power-on period varies in relation to the number of parallel conditional full pixel samplings performed, and powering down the ADC in another portion of the readout period; and
converting, with the ADC, samples corresponding to those pixels in the set of pixels during the power-on period.

9. The method of claim 8, further comprising:
accessing a sample from a selected readout circuit; and
determining whether a charge associated with a pixel corresponding to the accessed sample is less than a conversion threshold based on the access sample.

10. The method of claim 9, further comprising:
outputting a zero pixel value for the pixel in response to a determination that the charge associated with the pixel is less than the conversion threshold.

11. The method of claim 9, further comprising:
determining whether a charge associated with the pixel corresponding to the accessed sample is greater than or equal to a saturation threshold based on the accessed sample.

12. The method of claim 11, further comprising:
outputting a saturation pixel value for the pixel in response to a determination that the charge associated with the pixel is greater than or equal to the saturation threshold.

13. The method of claim 11, further comprising:
determining whether a charge associated with the pixel corresponding to the accessed sample is greater than or equal to the conversion threshold and less than the saturation threshold based on the accessed sample; and
selecting the pixel for readout if the charge associated with the pixel is greater than or equal to the conversion threshold and less than the saturation threshold.

14. The method of claim 8, further comprising:
operating an amplifier during the power-on period, the amplifier configured to amplify samples corresponding to the pixels in the subset of pixels before the samples are converted by the ADC, and powering down the amplifier in another portion of the readout period.

15. An integrated-circuit image sensor comprising:
a pixel array comprising a plurality of pixels and corresponding readout circuitry configured to sample a subset of the plurality of pixels in parallel;
a plurality of classifiers each configured to classify a different one of the pixels in a sampled subset, wherein a pixel is classified as an above threshold pixel in response to a determination that a sample associated with the pixel is greater than or equal to a conversion threshold and less than a saturation threshold;
an Analog-to-Digital Converter (ADC); and
a controller configured to operate the ADC during a power-on period of a readout period, wherein the ADC converts samples associated with above threshold pixels in the sampled subset during the power-on period to produce converted pixel values, the length of the power-on period based on the number of above threshold pixels, the controller further configured to power down the ADC during at least one portion of the readout period when the ADC is not converting samples associated with above threshold pixels.

16. The integrated-circuit image sensor of claim 15, wherein a pixel is classified as below threshold in response to a determination that a sample associated with the pixel is less than the conversion threshold, and wherein the controller is further configured to output a zero pixel value for each pixel classified as a below threshold pixel.

17. The integrated-circuit image sensor of claim 16, wherein a pixel is classified as saturated in response to a determination that a sample associated with the pixel is greater than or equal to the saturation threshold, and wherein the controller is further configured to output a saturated pixel value for each pixel classified as a saturated pixel.

18. The integrated-circuit image sensor of claim 17, wherein the power-on period begins at the beginning of readout of pixel values associated with the plurality of pixels.

19. The integrated-circuit image sensor of claim 18, wherein the controller is configured to output at least some of the zero pixel values or the saturated pixel values during the power-on period.

20. The integrated-circuit image sensor of claim 15, wherein the controller is further configured to:
operate an amplifier during the power-on period, the amplifier configured to amplify a sample associated with an above threshold pixel before the sample is converted by the ADC, and to power down the amplifier during at least one portion of the readout period.

* * * * *